United States Patent
Iritani et al.

(10) Patent No.: US 7,479,921 B2
(45) Date of Patent: Jan. 20, 2009

(54) DISTANCE MEASURING DEVICE, DISTANCE MEASURING METHOD AND DISTANCE MEASURING PROGRAM

(75) Inventors: Tadamitsu Iritani, Tokushima (JP); Kazuhiro Wakabayashi, Suita (JP)

(73) Assignees: The University of Tokushima, Tokushima (JP); Nohken Inc., Osaka (JP)

( * ) Notice: Subject to any disclaimer, the term of this patent is extended or adjusted under 35 U.S.C. 154(b) by 183 days.

(21) Appl. No.: 11/486,086

(22) Filed: Jul. 14, 2006

(65) Prior Publication Data
US 2007/0013578 A1    Jan. 18, 2007

(30) Foreign Application Priority Data
Jul. 15, 2005    (JP)    ............................. 2005-206798

(51) Int. Cl.
G01S 13/08    (2006.01)
G01S 13/00    (2006.01)

(52) U.S. Cl. .................. 342/118; 342/128; 342/194; 342/196

(58) Field of Classification Search .................. 342/25, 342/28, 73, 82–87, 98–103, 107, 109, 115, 342/124, 192, 194–196, 200, 118, 127–133
See application file for complete search history.

(56) References Cited

U.S. PATENT DOCUMENTS

| | | | |
|---|---|---|---|
| 3,113,309 A | | 12/1963 | Kuecken |
| 4,238,795 A | * | 12/1980 | Schiek et al. .............. 342/127 |
| 5,329,467 A | | 7/1994 | Nagamune et al. |
| 5,582,566 A | | 12/1996 | Imasaka et al. |
| 6,133,993 A | | 10/2000 | Labaar |
| 7,145,502 B2 | | 12/2006 | Uebo et al. |
| 2006/0023571 A1 | | 2/2006 | Uebo et al. |

FOREIGN PATENT DOCUMENTS

EP    1 512 987 A1    3/2005

(Continued)

OTHER PUBLICATIONS

Fujimori et al. (Circuits and Systems, 2004. MWSCAS '04. The 2004 47th Midwest Symposium on, vol. 1, Jul. 25-28, 2004 pp. I-361-I-364 vol. 1).*

(Continued)

*Primary Examiner*—Thomas H Tarcza
*Assistant Examiner*—Peter M Bythrow
(74) *Attorney, Agent, or Firm*—McDermott Will & Emery LLP

(57) ABSTRACT

A transmission unit emits an electromagnetic wave having the same frequency f as an output signal from a sending unit in a direction of a measurement axis. A detecting unit performs synchronous detection on a reflected wave detected by a directional coupler by an in-phase signal and a quadrature signal of the transmission signal, and by extracting DC component from the detection signal, detects the in-phase component and quadrature component of the reflected wave. An analysis signal generating unit mixes the in-phase component and quadrature component of the reflected wave and signals having periodicity corresponding to a prescribed distance, and using only one of the resulting side bands, generates an analysis signal. Fourier transform unit finds distance to the object of measurement from a profile obtained by Fourier transform of the analysis signal.

18 Claims, 12 Drawing Sheets

FOREIGN PATENT DOCUMENTS

| | | |
|---|---|---|
| JP | 7-159522 | 6/1995 |
| JP | 11-316271 | 11/1999 |
| JP | 2002-357656 | 12/2002 |
| JP | 3461498 | 8/2003 |
| JP | 2003-529050 | 9/2003 |
| JP | 2004-085473 | 3/2004 |
| JP | 2004-109123 | 4/2004 |
| JP | 2004-325085 | 11/2004 |
| KR | 10-2004-0105758 | 12/2004 |
| KR | 10-0684811 | 2/2007 |
| TW | 166041 | 8/1991 |
| TW | 251353 | 7/1995 |
| WO | WO 94/24579 | 10/1994 |
| WO | WO 01/16554 A2 | 3/2001 |

OTHER PUBLICATIONS

Taiwanese Office Action issued in Taiwanese Patent Application No. 095124767 dated Nov. 19, 2007.

Korean Office Action issued in Korean Application No. KR 10-2006-00507338, dated Apr. 24, 2007.

Uebo, et al., "Standing Wave Radar Capable of Measuring Distances down to Zero Meters," IEICE Transactions on Communications, Jun. 2005, pp. 2609-2615, vol. E88-B, No. 6, Communications Society, Tokyo, Japan.

Fujimori, et al., "Measurement of Distance and Velocity of a Moving Target by Short-Range High-Resolution Radar Utilizing Standing Wave," The 47th IEEE International Midwest Symposium on Circuits and Systems, Jul. 25, 2004, pp. 1361-1364, vol. 1.

Extended European Search Report issued in corresponding European Patent Application No. EP 06 01 4738, dated Aug. 28, 2006.

Korean Office Action, issued in corresponding Korean Patent Application No. 9-5-2007-054601009 dated on Oct. 12, 2007.

* cited by examiner

DISTANCE MEASURING DEVICE, DISTANCE MEASURING METHOD AND DISTANCE MEASURING PROGRAM

BACKGROUND OF THE INVENTION

1. Field of the Invention

The present invention relates to a distance measuring device, a distance measuring method and a distance measuring program. More specifically, the present invention relates to a distance measuring device, a distance measuring method and a distance measuring program for measuring distance to an object of measurement using an electromagnetic wave emitted to the object.

2. Description of the Background Art

Methods of measuring distance to an object of detection utilizing a microwave generally used at present is roughly classified into FMCW (Frequency Modulated Continuous Wave) based method and pulse-radar based method.

In the FMCW based method, frequency-swept continuous waves are sent, and from frequency difference between the emitted signal and a reflected signal, the distance to the object of detection is found (see, for example, Japanese Patent Laying-Open No. 07-159522).

In pulse radar, the time from sending a pulse signal until the pulse signal is reflected by the object of detection and returns is measured, and the distance to the object of detection is found from the measured time (see International Publication No. WO94/24579).

Though the two methods both have high measurement accuracy, the methods respectively have the following problems.

First, in the FMCW method, the measurement accuracy is determined by the sweep width of emission frequency, as represented by the equation: measurement accuracy=speed of light/(2×width of frequency sweep), and therefore, in order to attain high accuracy, it is necessary to use wide bandwidth. In the frequency band of 24.15 GHz specified by the Radio Law as the band for sensors for detecting moving object, which is normally used by the distance measuring device, available bandwidth is limited to 0.1 GHz from effective frequency of 24.1 to 24.2 GHz, because of regulations on specified low power radio station. Therefore, bandwidth is insufficient for outdoor-use of an FMCW microwave type level meter, so that the measurement accuracy is limited and measurement of short distance is difficult.

Second, in the pulse-radar method, in order to generate very short electric pulses by an emitter, wide radio wave bandwidth is necessary when the components are considered. By way of example, the bandwidth necessary for generating an impulse of 2n second is 2 GHz. Therefore, in this case also, outdoor use is limited because of the restriction of bandwidth defined by the Radio Law, and measurement of short distance is difficult, as shorter electric pulses cannot be used.

In order to solve these problems, it is necessary to satisfy the radio wave bandwidth and emission gain, and to maintain high measurement accuracy regardless of the measurement distance, particularly at a short distance.

The two methods of measurement use wide bandwidth, and therefore, these cannot be used as the specified low power radio station as classified by the Radio Law. These methods, however, can be used as an extremely low power radio station, with the output power kept low. When the output power of emission signal is made lower, however, the power of the reflected signal also comes to be very low. This leads to a problem that measurement of long distance comes to be highly susceptible to the influence of noise.

Recently, a distance measuring device having high measurement accuracy even for a short distance is proposed (see, for example, Japanese Patent Laying-Open No. 2002-357656).

FIG. 10 is a schematic block diagram representing an arrangement of distance measuring device proposed in Japanese Patent Laying-Open No. 2002-357656.

Referring to FIG. 10, the distance measuring device includes: a sending source 60 outputting a signal of a prescribed frequency; a transmission unit 70 emitting an electromagnetic wave of the same frequency as the output signal of sending source 60; a detecting unit 80 detecting an amplitude of a standing wave S formed by an interference between the electromagnetic wave (hereinafter also referred to as a traveling wave D) emitted from transmission unit 70 and a reflected wave R reflected by objects of measurement $M_1$ to $M_n$ (n is a natural number); and a signal processing unit 90 calculating the distance to the object of measurement $M_k$ (k is a natural number not larger than n) from the detection signal of detecting unit 80.

Sending source 60 includes a sending unit 62 and a frequency control unit 64. Sending unit 62 outputs a signal of constant frequency f controlled by frequency control unit 64 to transmission unit 70. Frequency control unit 64 outputs information related to the frequency f sent to sending unit 62 also to signal processing unit 90.

The principle of measurement in the distance measuring device shown in FIG. 10 will be briefly described.

First, as shown in FIG. 10, the traveling wave D emitted from transmission unit 70 interferes with the reflected wave R reflected by the object of measurement $M_k$, so that a standing wave S is formed in the propagation medium between transmission unit 70 and the object of measurement $M_k$.

At this time, a reception power signal p(f, x) obtained through monitoring of the standing wave S at a detecting unit 80 provided on a point of monitoring xs on the x-axis is a sinusoidal wave function (cos function) of the frequency f of traveling wave D. Particularly when there are reflections from a plurality of objects of measurement, the signal would be a composition of a plurality of sinusoidal waves having mutually different periods corresponding to respective objects of measurement. The period of each sinusoidal wave is in inverse proportion to the distance from the point of monitoring to the object of measurement $M_k$. The distance measuring device shown in FIG. 10 measures the distance to the object $M_k$ utilizing this characteristic.

Specifically, the standing wave S is generated by additive composition of traveling wave D emitted from transmission unit 70 and reflected wave R reflected from the object $M_k$, of which power signal p(f, x) is given by:

$$p(f, x) \approx A^2 + 2\sum_{k=1}^{n} A^2 \gamma_k \cos\left(\frac{4\pi(d_k - x)}{c} f + \phi_k\right) \quad \text{Equation (1)}$$

where c represents speed of light, f represents transmission frequency, A represents amplitude level of traveling wave D, and $d_k$ represents distance to the object of measurement $M_k$. Further, $\gamma_k$ represents magnitude of reflection coefficient of the object of measurement $M_k$ including propagation loss, and $\phi_k$ represents an amount of phase shift in reflection.

FIG. 11 is a diagram of waveform of the reception power signal p(f, 0) monitored at the position of $x=x_s=0$, when the object $M_k$ is positioned at a distance $d_k$.

It can be seen from FIG. 11 that the reception power signal p(f, 0) is periodical with respect to the transmission frequency f. Further, it can be seen that the period is c/2d, and is in inverse proportion to the distance d to the object of measurement.

Therefore, by Fourier transform of the reception power signal p(f, 0) to extract period information, the distance d to the object of measurement can be found. Here, a profile P(x) obtained by applying Fourier transform on the reception power signal p(f, 0) of Equation (1) is expressed as:

$$P(x) = \int_{f_0-\frac{f_W}{2}}^{f_0+\frac{f_W}{2}} p(f, 0)e^{-j\frac{4\pi x}{c}f} df = \quad \text{Equation (2)}$$

$$f_W A^2 e^{-j\frac{4\pi x}{c}f_0}\left\{S_a\left(\frac{2\pi f_W}{c}x\right) + \right.$$

$$\sum_{k=1}^{n} \gamma_k e^{-j\left(\frac{4\pi d_k}{c}f_0+\phi_k\right)}S_a\left(\frac{2\pi f_W}{c}(x-d_k)\right) +$$

$$\left.\sum_{k=1}^{n} \gamma_k e^{-j\left(\frac{4\pi d_k}{c}f_0+\phi_k\right)}S_a\left(\frac{2\pi f_W}{c}(x+d_k)\right)\right\}$$

where $$S_a(z) = \frac{\sin(z)}{z} \quad \text{Equation (3)}$$

Here, $f_0$ represents intermediate frequency of the transmission frequency band, and $f_w$ represents bandwidth of the transmission frequency.

Namely, in the distance measuring device of FIG. 10, the distance $d_k$ to the object of measurement $M_k$ depends solely on the vibration period of reception power signal p(f, 0) with respect to the transmission frequency f of the traveling wave D, and not influenced by the time from the emission of electromagnetic wave from transmission unit 70 until return to detecting unit 80. Therefore, it is possible to measure a short distance with higher accuracy than the conventional FMCW method and pulse radar method.

Here, in the conventional distance measuring device shown in FIG. 10, the reception power signal p(f, 0) of the standing wave S is subjected to Fourier transform in accordance with Equation (2), and therefore, accurate periodic information can be extracted only when the reception power signal p(f, x) has periodicity of at least one period in the bandwidth $f_w$ of transmission frequency.

FIG. 12 represents magnitude |P(x)| of the profile of reception power signal when the distance $d_k$ of the object of measurement $M_k$ is changed in the range of 0 m≦$d_k$≦5 m under the conditions that $f_0$=24.0375 GHz, $f_w$=75 MHz, $\gamma_k$=0.1 and $\phi_k$=π, found through calculations in accordance with Equations (1) and (2). Here, p(f, 0)−$A^2$, with the level $A^2$ of traveling wave subtracted, is subjected to Fourier transform, and therefore, the first term of Equation (1) is removed.

Referring to FIG. 12, the profile magnitude |P(x)| comes to have a waveform that has local maximums both in a region where x is positive and in a region where x is negative, corresponding to the components of the second and third terms of Equation (2). In the conventional distance measuring device, for the object of measurement $M_k$, x is always in the positive region, and therefore, the local maximum in one region (x>0) of the waveform is extracted and the value x that corresponds to the local maximum is determined to be the position of the object $M_k$.

When the distance d is small, however, the peak of profile magnitude |P(x)| does not indicate the accurate position of the object $M_k$, as shown in FIG. 12. The reason for this is as follows. As the distance d becomes smaller, two local maximums come to interfere with each other, making the waveform irregular. In the example shown in FIG. 12, it can be seen that accurate measurement is possible when the distance d is 2 m or longer, while a correct measurement cannot be obtained when the distance d becomes shorter than 2 m.

Specifically, the conventional distance measuring device has a problem of increased measurement error at shorter distance, which derives from the influence of the local maximum appearing in the region where x is negative on the local maximum appearing in the region where x is positive (hereinafter also referred to the negative frequency influence).

FIG. 13 shows a relation between the measurements obtained from the profile P(x) when the distance $d_k$ to the object $M_k$ is at a short distance level (~10 m) and the actual distance to the object $M_k$. The relation shown in the figure is obtained under the measurement conditions that central frequency $f_0$ of transmission frequency f is 24.15 GHz and the transmission frequency bandwidth $f_w$ is 75 MHz, for the traveling wave D emitted from transmission unit 70.

Referring to FIG. 13, the measurement error generated between the measurement obtained from the conventional distance measuring apparatus and the actual distance $d_k$ to the object $M_k$ is larger as the distance to the object $M_k$ is smaller. Specifically, where the distance to the object of measurement $M_k$ is 4 m or longer, the measured value accurately matches the actual distance to the object $M_k$, while the measurement error abruptly increases where the distance becomes shorter than 4 m. In a region where the distance to the object of measurement $M_k$ is 2 m or shorter, the measurement error comes to be as large as about 1000 mm, and the measurement accuracy is degraded significantly. This results from distortion of profile P(x) at a short distance, suggesting that 2 m is the limit of measurable distance.

This will be described in greater detail. When the distance $d_k$=2 m, the period of reception power signal p(f, 0) is c/(2× 2)75 MHz, and therefore, the transmission frequency bandwidth $f_w$=75 MHz exactly corresponds to the bandwidth of one period of the reception power signal p(f, x). Therefore, a longer distance $d_k$, which leads to a shorter period, provides an accurate measurement. Accordingly, the minimum detectable distance $d_{min}$ can be given by the following equation.

$$d_{min}=c/2f_W \quad \text{Equation (4)}$$

When the conventional distance measuring device is used as the specified low power radio station, the available frequency bandwidth is limited by the laws like the Radio Law. For instance, according to the section of "Sensors for Detecting Moving Object" of the Japanese Radio Law, when the frequency band of 24.15 GHz is used, the tolerable value of the occupied bandwidth is defined to be 76 MHz. Therefore, as in the example of FIG. 13, the result of measurement involves significant error in measuring a position at a short distance of 2 m or shorter.

The measurement error described above is particular to short distance where the reception power signal p(f, x) comes to be equal to or smaller than one periodic component. Even at a distance involving periodicity not smaller than one periodic component (middle to far distance), there might be a measurement error of a few millimeters (mm), as will be described in the following.

FIG. 14 shows a relation between the measurements obtained from the profile P(x) when the distance $d_k$ to the object $M_k$ is at a long distance level (~20 m) and the actual distance to the object $M_k$. The relation shown in the figure is obtained under the measurement conditions that central frequency $f_0$ of transmission frequency f is 24.15 GHz and the transmission frequency bandwidth $f_w$ is 75 MHz, for the traveling wave D emitted from transmission unit 70.

Referring to FIG. 14, when the position of the object $M_k$ is changed from the distance $d_k=10$ m to $d_k=20$ m at a long distance level, there is an error of about ±2 mm at the largest in the result of measurement. One possible cause of the error is that window length of a window function for Fourier transform is not an integer multiple of the waveform of reception power signal p(f, 0).

Further, at a middle to long distance, measurement error occurs when the position of the object $M_k$ changes slightly, even though the reception power signal p(f, 0) has periodicity.

FIG. 15 shows measurement error when the position of the object $M_k$ is changed slightly within the range of ±10 mm, using the position at a distance $d_k=10$ m as a reference.

As is apparent from FIG. 15, even when the object $M_k$ is positioned at a distance of $d_k=10$ m, which is far from the distance measuring device and where the reception power signal p(f, 0) has sufficient periodicity, the result of measurement involves an error of about ±5 cm.

Here, the following approaches may be taken to reduce the measurement error. As a first approach, at the time of Fourier transform of the reception power signal p(f, 0), a signal range including at least one periodic component is extracted from the reception power signal p(f, 0) and subjected to Fourier transform, and this process is repeated over the range of at least half the periodic component. From each data after Fourier transform, a sum of each time domain is calculated.

As a second approach, a reception power signal is obtained by slightly shifting the initial frequency to be transmitted, with the bandwidth $f_w$ used for the transmission frequency f being the same, and the obtained reception signal is subjected to Fourier transform. This process is repeated over the range of at least half the periodic component. From each data after Fourier transform, a sum of each time domain is calculated.

FIG. 16 shows the result of processing when the reception power signal p(f, 0) is multi-processed in accordance with these approaches. As can be seen from FIG. 16, the error observed in the result of measurement is improved to about ±1 cm, with the range of displacement being ±10 mm.

Such a multi-processing, however, includes a plurality of Fourier transform processes, and therefore, takes considerably long time. Thus, it is not suitable for an application that requires quick response.

The distance measuring device shown in FIG. 10 further has a problem that the result of measurement has some error when the object of measurement $M_k$ is moving on an axis of measurement (x-axis) at a constant speed.

More specifically, when the object of measurement $M_k$ is moving, Doppler shift occurs in the reception power signal p(f, 0) of the standing wave S detected at detecting unit 80, in which the reception frequency is shifted from the transmission frequency f by the frequency in proportion to the time-change of the propagation medium. The amount of shifting here acts to decrease the reception frequency when the object $M_k$ is coming closer, and acts to increase the reception frequency when the object $M_k$ is moving away.

By way of example, assume that the object of measurement $M_k$ positioned at a prescribed distance $d_k=10$ m is moving at a constant speed. Further, assume that the conventional distance measuring device performs, at transmission unit 70, upward frequency sweep in which the transmission frequency f is increased within the used bandwidth during sweeping and downward frequency sweep in which the transmission frequency f is decreased within the used bandwidth during sweeping.

At this time, dependent on the direction of movement of the object of measurement $M_k$ and on the direction of sweeping transmission frequency f, the following phenomenon occurs periodically in the reception power signal p(f, 0). Specifically, during upward sweep, the periodicity becomes longer when the object $M_k$ is coming closer, and the periodicity becomes shorter when the object $M_k$ is going away. During downward sweep, the periodicity becomes shorter when the object $M_k$ is coming closer, and the periodicity becomes longer when the object $M_k$ is going away.

When the periodicity becomes longer, periodicity of at least one period is lost in the reception power signal p(f, 0) in the transmission frequency bandwidth $f_w$ regardless of the sweeping direction, so that the measurement error caused by the negative frequency influence mentioned above increases.

Here, the measurement error is influenced by the Doppler shift described above, and hence, the error from the actual position (10 m) of the object of measurement $M_k$ increases as the speed of movement of the object $M_k$ increases, both in the upward and downward sweeps.

As an approach for reducing such measurement error, a method may be adopted in which a result of measurement (hereinafter also referred to as first position information) obtained by Fourier transform of the reception power signal p(f, 0) obtained by upward sweep of the transmission frequency f and a result of measurement (hereinafter also referred to as second position information) obtained by Fourier transform of the reception power signal p(f, 0) obtained by downward sweep of the transmission frequency f are obtained, and a correction process is performed by finding an average of the first and second position information, so that the position of the moving object is detected.

FIG. 17 shows the result of correction in accordance with this method. Referring to FIG. 17, when the sweep time is 10 msec., the measurement error is kept 0 m in the range where the speed of movement is at most about ±2 m/s. It can be seen, however, that the measurement error increases when the speed of movement increases, exceeding this range. This comes from the negative frequency influence mentioned above. Specifically, in the conventional distance measuring device, only the local maximum of the region where x is positive is uniformly extracted in the waveform of profile magnitude |P(x)|, and therefore, it is difficult to accurately detect the object of measurement $M_k$ that is in the region where x is negative and is moving away at high speed.

Though not shown, by making shorter the sweep time, it is possible to enlarge the range of speed of movement in which the accurate position of the object of measurement $M_k$ can be obtained.

In this method, however, the range of speed of movement of the object of measurement $M_k$ that allows correction depends of the sweep time of transmission frequency f. Accordingly, for the object $M_k$ moving at high speed, the sweep time must be made even shorter, that is, the speed of sweep must be increased. For this purpose, a new, stable, high-speed-variable oscillator is necessary.

SUMMARY OF THE INVENTION

An object of the present invention is to provide a distance measuring device, a distance measuring method and a distance measuring program that allow highly accurate measurement to a short distance, even in a narrow emission frequency bandwidth.

Another object of the present invention is to provide a distance measuring device, a distance measuring method and a distance measuring program that allow accurate measurement of distance to a moving object.

According to an aspect, the present invention provides a distance measuring device measuring a distance to an object, including: a sending source outputting a transmission signal having a variable frequency; a transmission unit generating and emitting to the object of measurement an electromagnetic wave of the same frequency as the transmission signal; a detecting unit detecting a reflected wave of the electromagnetic wave; and a signal processing unit calculating a distance to the object of measurement by an operation of a relation between the detected reflected wave and the frequency of the transmitted signal. The detecting unit includes a wave-detecting unit performing synchronous detection of the detected reflected wave with the transmission signal, to extract a phase change component of the reflected wave. The signal processing unit includes a frequency converting unit changing variable frequency of the extracted phase change component by a frequency corresponding to a prescribed distance, an analysis signal generating unit taking, as an analysis signal, one of upper and lower side bands obtained by the frequency converting unit, and a Fourier transform unit performing Fourier transform on the analysis signal to calculate a profile, and finding distance to the object of measurement based on a local maximum of the profile and the prescribed distance.

Preferably, the sending source includes an upward sweeping unit sweeping upward a prescribed transmission frequency with a prescribed bandwidth at a prescribed step, and a downward sweeping unit sweeping downward the prescribed transmission frequency with the prescribed bandwidth at the prescribed step. The signal processing unit includes a unit holding, as first position information, a distance to the object of measurement obtained by the Fourier transform unit through the upward sweeping unit, and as second position information, a distance to the object of measurement obtained by the Fourier transform unit through the downward sweeping unit, and a correcting unit averaging the held first position information and second position information to derive true distance to the object of measurement.

Preferably, the wave-detecting unit extracts in-phase component of the phase change component by synchronous detection of the reflected wave with the transmission signal, and extracts quadrature component of the phase change component by synchronous detection of the reflected wave with a signal different in phase by $\pi/2$ from the transmission signal.

Preferably, the prescribed distance is variable in accordance with a number of divisions for sweeping a prescribed transmission frequency with a prescribed bandwidth.

Preferably, the prescribed distance is set, at the largest, to be approximately a half of the maximum detectable distance determined by the prescribed bandwidth and the number of divisions.

Preferably, the wave-detecting unit extracts the phase change component of the reflected wave by subtracting DC component of the transmission signal from the reflected wave subjected to envelope detection.

According to another aspect, the present invention provides a distance measuring method of measuring a distance to an object, including the steps of: outputting a signal having a variable frequency; generating and emitting to the object of measurement an electromagnetic wave of the same frequency as the signal; detecting a reflected wave of the electromagnetic wave; and calculating a distance to the object of measurement by an operation of a relation between the detected reflected wave and the frequency of the signal. The step of detecting a reflected wave includes the step of extracting a phase change component of the reflected wave by synchronous detection of the detected reflected wave with the signal. The step of calculating the distance to the object of measurement includes the steps of changing variable frequency of the extracted phase change component by a frequency corresponding to a prescribed distance, taking, as an analysis signal, one of upper and lower side bands obtained by the frequency change, performing Fourier transform on the analysis signal to calculate a profile, and finding distance to the object of measurement based on a local maximum of the profile and the prescribed distance.

Preferably, the step of outputting a signal having variable frequency includes the steps of sweeping upward a prescribed transmission frequency with a prescribed bandwidth at a prescribed step, and sweeping downward the prescribed transmission frequency with the prescribed bandwidth at the prescribed step. The step of calculating the distance to the object of measurement further includes the steps of holding, as first position information, a distance to the object of measurement obtained by the Fourier transform through upward sweeping, and as second position information, a distance to the object of measurement obtained by the Fourier transform through downward sweeping, and averaging the held first position information and second position information to derive true distance to the object of measurement.

Preferably, in the step of extracting phase change component of the reflected wave, in-phase component of the phase change component is extracted by synchronous detection of the reflected wave with the signal, and quadrature component of the phase change component is extracted by synchronous detection of the reflected wave with a signal different in phase by $\pi/2$ from the signal.

Preferably, the prescribed distance is variable in accordance with a number of divisions for sweeping a prescribed transmission frequency with a prescribed bandwidth.

Preferably, the prescribed distance is set, at the largest, to be approximately a half of the maximum detectable distance determined by the prescribed bandwidth and the number of divisions.

Preferably, in the step of extracting the phase change component of the reflected wave, the phase change component of the reflected wave is extracted by subtracting DC component of the signal from the reflected wave subjected to envelope detection.

According to a further aspect, the present invention provides a distance measuring program for measuring a distance to an object, causing a computer to execute the steps of: outputting a signal having a variable frequency; generating and emitting to the object of measurement an electromagnetic wave of the same frequency as the signal; detecting a reflected wave of the electromagnetic wave; and calculating a distance to the object of measurement by an operation of a relation between the detected reflected wave and the frequency of the signal. The step of detecting a reflected wave includes the step of extracting a phase change component of the reflected wave by synchronous detection of the reflected wave with the signal; and the step of calculating the distance to the object of measurement includes the steps of changing variable frequency of the extracted phase change component by a frequency corresponding to a prescribed distance, taking, as an analysis signal, one of upper and lower side bands obtained by the frequency change, performing Fourier transform on the analysis signal to calculate a profile, and finding distance to the object of measurement based on a local maximum of the profile and the prescribed distance.

Preferably, the step of outputting a signal having variable frequency includes the steps of sweeping upward a prescribed transmission frequency with a prescribed bandwidth at a prescribed step, and sweeping downward the prescribed transmission frequency with the prescribed bandwidth at the prescribed step. The step of calculating the distance to the object of measurement further includes the steps of holding, as first position information, a distance to the object of measurement obtained by the Fourier transform through upward sweeping, and as second position information, a distance to the object of measurement obtained by the Fourier transform through downward sweeping, and averaging the held first position information and second position information to derive true distance to the object of measurement.

Preferably, in the step of extracting phase change component of the reflected wave, in-phase component of the phase change component is extracted by synchronous detection of the reflected wave with the signal, and quadrature component of the phase change component is extracted by synchronous detection of the reflected wave with a signal different in phase by $\pi/2$ from the signal.

Preferably, the prescribed distance is variable in accordance with a number of divisions for sweeping a prescribed transmission frequency with a prescribed bandwidth.

Preferably, the prescribed distance is set, at the largest, to be approximately a half of the maximum detectable distance determined by the prescribed bandwidth and the number of divisions.

Preferably, in the step of extracting the phase change component of the reflected wave, the phase change component of the reflected wave is extracted by subtracting DC component of the signal from the reflected wave subjected to envelope detection.

According to the present invention, a distance measuring device that allows highly accurate distance measurement from 0 m, even in a limited transmission frequency bandwidth, can be provided.

Further, even when the object of measurement is moving fast, the distance can be measured with high accuracy independent of the sweep time, as the result of measurement obtained by upward sweep and downward sweep of the transmission frequency is corrected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
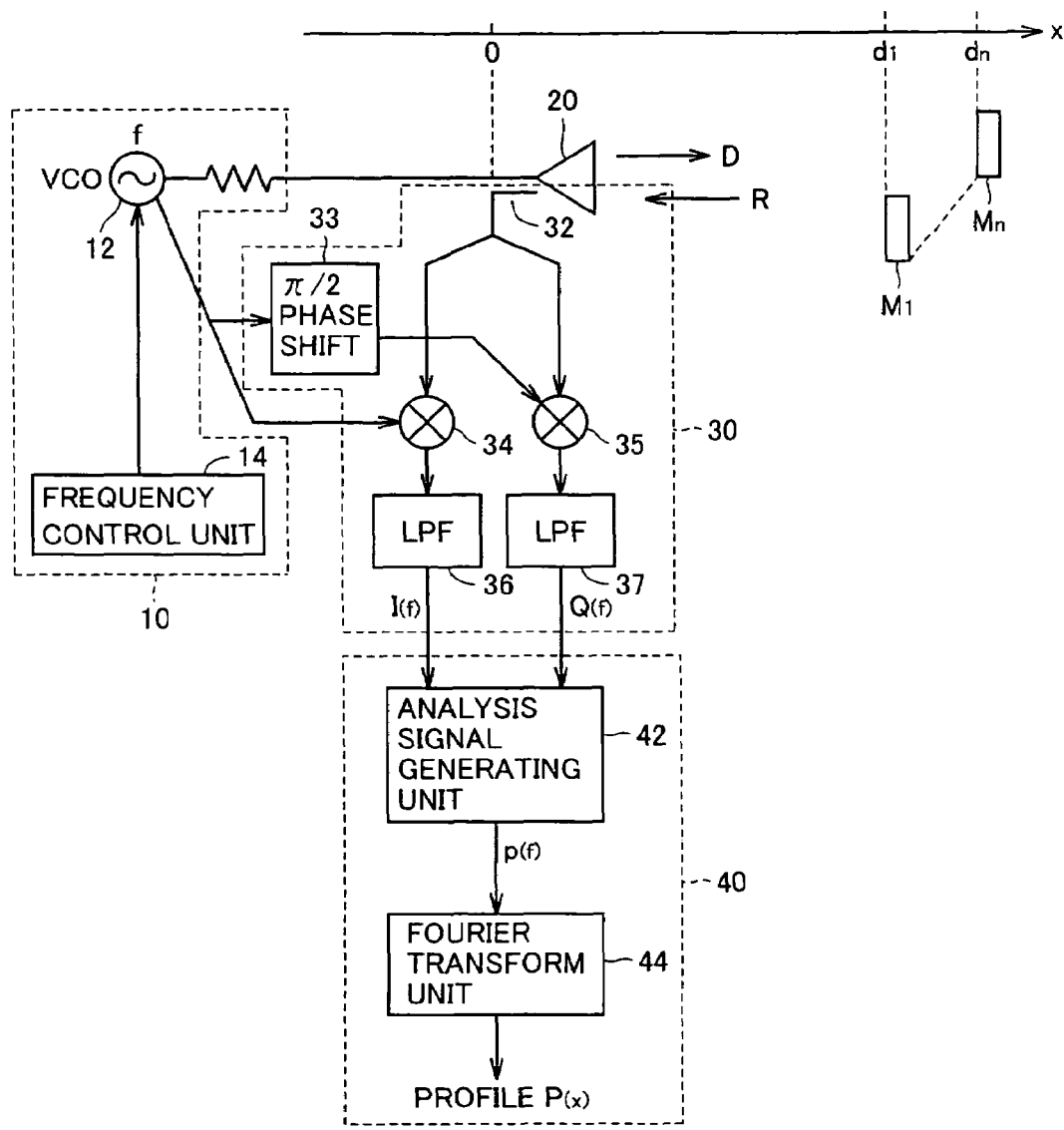
FIG. 1 is a circuit diagram showing a basic configuration of the distance measuring device in accordance with an embodiment of the present invention.

In the following, embodiments of the present invention will be described in detail with reference to the figures. In the figures, the same reference characters denote the same or corresponding portions.

FIG. 1 is a circuit diagram showing a basic configuration of the distance measuring device in accordance with an embodiment of the present invention.

Referring to FIG. 1, the distance measuring device includes: a sending source 10 sending a transmission signal having a constant transmission frequency $f_w$, a transmission unit 20 emitting an electromagnetic wave of the same frequency f as the sent transmission signal; a detecting unit 30 detecting electromagnetic waves (hereinafter also referred to as reflected waves R) that are the electromagnetic wave output from transmission unit 20 (hereinafter also referred to as traveling wave D) reflected by objects of measurement $M_1$ to $M_n$; and a signal processing unit 40 processing the reflected waves R detected by detecting unit 30 and calculating distances $d_1$ to $d_n$ to the objects of measurement $M_1$ to $M_n$.

Sending source 10 includes a sending unit 12 outputting the transmission signal having a constant transmission frequency f, and a frequency control unit 14 controlling the frequency f of the transmission signal output from sending unit 12.

Sending unit 12 is implemented, for example, by a voltage controlled oscillator (VCO), and outputs the transmission signal of a prescribed frequency f, based on a control signal from frequency control unit 14.

Frequency control unit 14 is implemented, for example, by a phase detector, and detects a phase difference between a reference oscillation signal from signal processing unit 40 and a return signal returning from sending unit 12 and outputs a control signal to increase or decrease the oscillation frequency of the VCO.

In sending unit 12, VCO receives the control signal and adjusts the oscillation frequency, so that the transmission signal having the same frequency and same phase as the reference oscillation signal and controlled to have the prescribed frequency f is output.

Transmission unit 20 is implemented, for example, by an antenna, and emits an electromagnetic wave having the same frequency f as the output signal of sending unit 12 to a propagation medium such as air or water, or vacuum, existing between the antenna and the objects of measurement $M_1$ to $M_n$, in the direction of a measurement axis (x-axis).

Detecting unit 30 includes a directional coupler 32, multipliers 34, 35, low-pass filters (LPFs) 36, 37 and a π/2 phase shifter 38.

Directional coupler 32 is arranged at a position of x=0 on the x-axis. Directional coupler 32 detects the reflected wave R from a signal received by the antenna of transmission unit 20, and outputs the detected reflected wave R to one input of each of multipliers 34 and 35.

To the other input of each of multipliers 34 and 35, the transmission signal having the transmission frequency f from the VCO as sending unit 12 is applied. At this time, a signal obtained by phase-shifting the transmission signal from sending unit 12 by π/2 using π/2 phase shifter 38 is applied to the other input of multiplier 35.

Thus, in multipliers 34 and 35, phase detection by multiplication of the reflected wave R and the signal synchronized with the transmission signal, that is, a so-called synchronous detection, is performed. From multiplier 34, an in-phase (I-phase) component I(f, t) of the detected signal is output as the result of multiplication of these two input signals. From multiplier 35, a quadrature (Q-phase) component Q(f, t) of the detected signal is output as the result of multiplication of these two input signals.

When the I-phase component I(f, t) and the Q-phase component Q(f, t) of the detected signal are applied to LPFs 36 and 37, respectively, a high-frequency component is removed, and DC components I(f) and Q(f) are extracted. The extracted DC components I(f) and Q(f) are output to signal processing unit 40.

Signal processing unit 40 is connected to detecting unit 30 and receives DC components I(f) and Q(f) of the reflected wave R.

Signal processing unit 40 includes an analysis signal generating unit 42 generating an analysis signal p(f) from the DC components I(f) and Q(f) of reflected wave R, and a Fourier transform unit 44 performing Fourier transform on the generated analysis signal p(f) to calculate the profile P(x). Here, analysis signal generating unit 42 and Fourier transform unit 44 are formed integrally by, for example, a digital signal processor (DSP). Thus, operations at various units are executed by software in accordance with a program stored beforehand.

Figure 10:
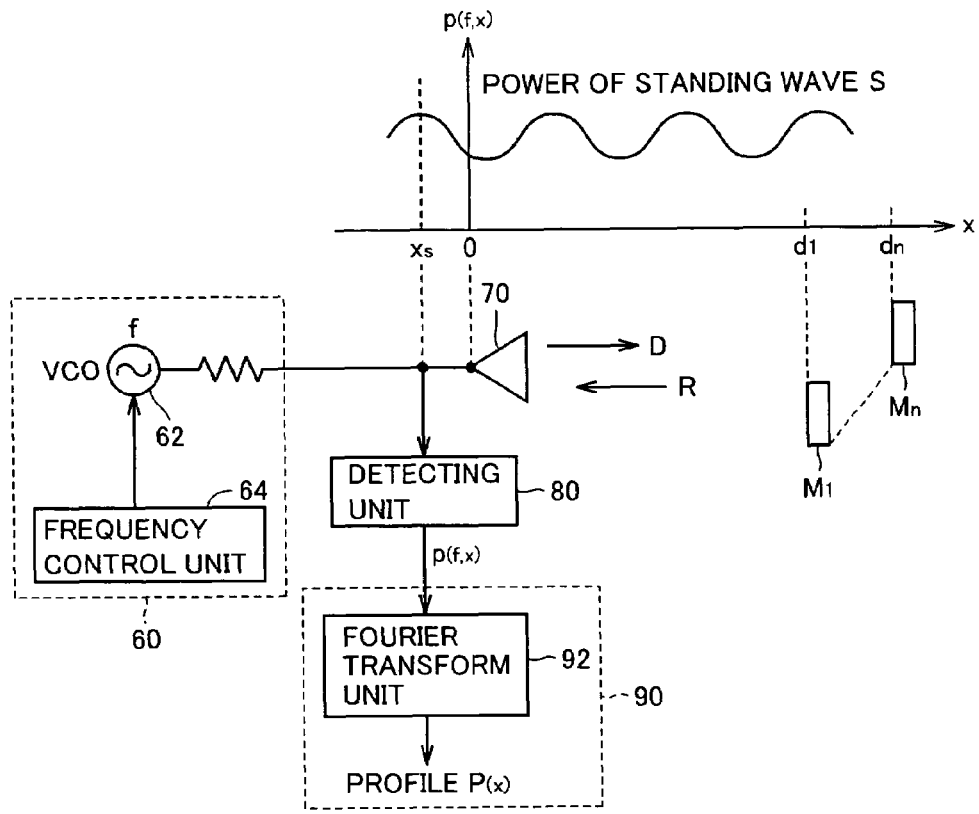
FIG. 10 is a schematic block diagram representing a configuration of the distance measuring device proposed in Japanese Patent Laying-Open No. 2002-357656.
Figure 11:
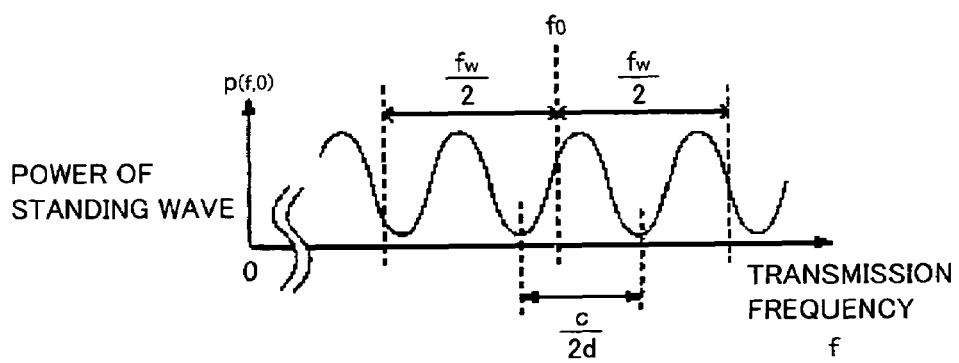
FIG. 11 is a diagram of waveform of the reception power signal p(f, 0) monitored at the position of $x=x_s=0$, when the object of measurement $M_k$ is positioned at a distance $d_k$.

As described above, the distance measuring device in accordance with the present embodiment has the same basic configuration as the conventional distance measuring device shown in FIG. 10. The device, however, differs from the conventional distance measuring device in that the reflected wave R is detected by detecting unit 30 and that signal processing unit 40 includes analysis signal generating unit 42. The method of measuring distance in accordance with the present embodiment will be described in detail in the following, to clarify the effects attained by these differences.

First, the principle of measurement of the distance measuring method in accordance with the present embodiment will be described.

In the distance measuring device shown in FIG. 1, assume that the traveling wave D emitted from transmission unit 20 at time t is represented by the following equation.

$$D(f,t) = Ae^{j(2\pi f)t} \quad \text{Equation (5)}$$

Then, the reflected wave R from each object of measurement $M_k$ can be expressed by the following equation, with the distance to each object of measurement being $d_k$.

$$R(f, t) = A\gamma_k e^{j\phi_k} \cdot e^{j\frac{2\pi f}{c}(2d_k)} \cdot e^{j(2\pi f)t} \quad \text{Equation (6)}$$

where c represents speed of light, f represents transmission frequency, A represents amplitude level of traveling wave D, and $d_k$ represents distance to the object of measurement $M_k$. Further, $\gamma_k$ represents magnitude of reflection coefficient of the object of measurement $M_k$ including propagation loss, and $\phi_k$ represents an amount of phase shift in reflection.

By performing synchronous detection on reflected wave R of Equation (6) with the transmission signal having the transmission frequency f and a quadrature signal of the transmission signal having its phase shifted by π/2, in multipliers 34 and 35, respectively, the in-phase component I(f, t) and the quadrature component Q(f, t) of the detection signal, represented by the equations below, are obtained.

$$I(f, t) = Ae^{j(2\pi f)t} \cdot A\gamma_k e^{j\phi_k} \cdot e^{j\frac{2\pi f}{c}(2d_k)} \cdot e^{j(2\pi f)t} \quad \text{Equation (7)}$$
$$= A^2\gamma_k e^{j\left(4\pi ft + \frac{4\pi f}{c}d_k + \phi_k\right)}$$

$$Q(f, t) = Ae^{j\left(2\pi ft + \frac{\pi}{2}\right)} \cdot A\gamma_k e^{j\phi_k} \cdot e^{j\frac{2\pi f}{c}(2d_k)} \cdot e^{j(2\pi f)t}$$
$$= A^2\gamma_k e^{j\left(4\pi ft + \frac{\pi}{2} + \frac{4\pi f}{c}d_k + \phi_k\right)}$$

Further, by removing the high-frequency component (corresponding to the second harmonic component of the transmission signal) through LPFs 36 and 37 from the in-phase component I(f, t) and the quadrature component Q(f, t) of Equation (7), DC components I(f) and Q(f) are extracted.

$$I(f) = A^2\gamma_k e^{j\left(\frac{4\pi f}{c}d_k + \phi_k\right)} \quad \text{Equation (8)}$$
$$Q(f) = A^2\gamma_k e^{j\left(\frac{4\pi f}{c}d_k + \phi_k + \frac{\pi}{2}\right)}$$

Here, referring to Equation (8), it can be seen that DC components I(f) and Q(f) are extraction of the amount of change (hereinafter also referred to as a phase change component) of phase shift amount $\phi_k$ when the traveling wave D is reflected at the object of measurement $M_k$, from the detection signal of reflected wave R given by Equation (7). Specifically, the DC components of Equation (8) are functions that vary in a period corresponding to the distance $d_k$ to the object of measurement $M_k$. Therefore, by Fourier transform of the DC component to extract the periodic component, the distance $d_k$ can be found.

The DC components of Equation (8) are expressed as a cos function and a sin function below, as real signals.

$$I(f) = A^2\gamma_k \cos\left(\frac{4\pi f}{c}d_k + \phi_k\right) \quad \text{Equation (9)}$$

$$Q(f) = A^2\gamma_k \cos\left(\frac{4\pi f}{c}d_k + \phi_k + \frac{\pi}{2}\right) \quad \text{Equation (10)}$$
$$= A^2\gamma_k \sin\left(\frac{4\pi f}{c}d_k + \phi_k\right)$$

Therefore, it is expected that the distance $d_k$ to the object of measurement $M_k$ can be obtained based on the local maximum of profile magnitude |P(x)|, which is obtained by Fourier transform of reception power signal p(f), which in turn is obtained as a complex sinusoidal function having Equations (9) and (10) as the in-phase component and the quadrature component.

Figure 12:
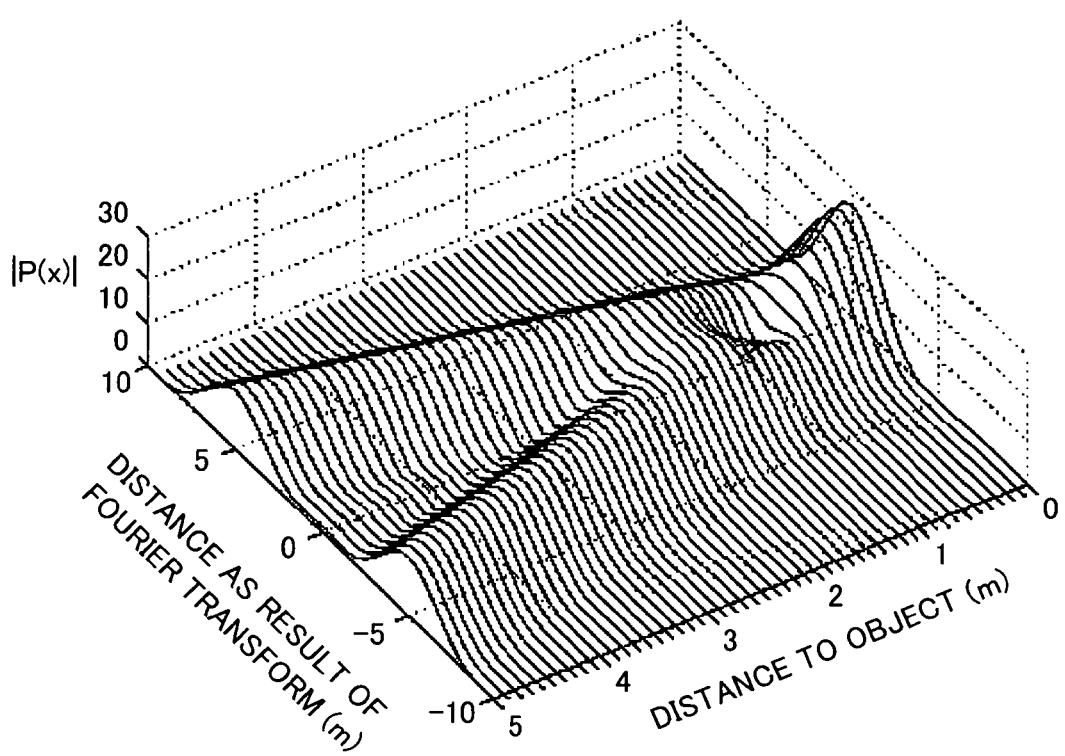
FIG. 12 shows a result of calculation of profile magnitude $|P(x)|$ when the distance $d_k$ of the object of measurement $M_k$ is in the range of 0 m to 5 m.

The profile P(x) obtained by Fourier transform of the complex sinusoidal function having Equations (9) and (10), however, involves the second term derived from $e^{+j\theta(f)}$ and the third term derived from $e^{-j\theta(f)}$ ($\theta(f)$ represents the phase change component), as in the profile P(x) of Equation (2) above. Therefore, in the similar manner as shown in FIG. 12, when the distance d is small, the local maximums corresponding to the second and third terms respectively interfere with each other in profile magnitude |P(x)|, increasing measurement error. In other words, the negative frequency influence cannot be avoided, and therefore, measurement error when the object is positioned at a close distance or when the object is moving, cannot be reduced.

In view of the foregoing, the distance measuring device in accordance with the present invention is characterized in that frequency conversion is performed so that the periodicity of complex sinusoidal function expressed by Equations (9) and (10) comes to correspond to the distance free of the negative frequency influence.

Specifically, a real signal having a period corresponding to the distance $d_k$, of which in-phase component and quadrature component are given by Equations (9) and (10), and signals $I_0(f)$ and $Q_0(f)$ having periods corresponding to a pre-set prescribed distance $d_0$ are mixed. The signals $I_0(f)$ and $Q_0(f)$ are given as:

$$I_0(f) = \cos\left(\frac{4\pi f}{c}d_0\right) \quad \text{Equation (11)}$$

$$Q_0(f) = \sin\left(\frac{4\pi f}{c}d_0\right) \quad \text{Equation (12)}$$

Accordingly, by mixing the real signals of Equations (9) and (10) with Equations (11) and (12), the analysis signal p(f) below is generated.

$$p(f) = I(f) \cdot I_0(f) + Q(f) \cdot Q_0(f) \quad \text{Equation (13)}$$

$$= A^2 \gamma_k \cos\left(\frac{4\pi(d_0 + d_k)}{c}f + \phi_k\right)$$

Specifically, the analysis signal p(f) of Equation (13) is periodical with respect to transmission frequency f, and the periodicity of the signal is higher by the period corresponding to distance $d_k$, than the periodicity corresponding to distance $d_0$.

When the signals $I_0(f)$ and $Q_0(f)$ corresponding to the distance $d_0$ are mixed with the real signals I(f) and Q(f) corresponding to the distance $d_k$ to the object of measurement $M_k$, in addition to the component of the sum of frequencies of these signals represented by Equation (13), a component of the difference of these signals is generated simultaneously. In the following, the frequency sum component will also be referred to as upper side band (USB) and the frequency difference component will also be referred to as lower side band (LSB).

When the signal including the upper side band USB and the lower side band LSB is subjected to Fourier transform, the resulting profile waveform has local maximums at positions shifted by $+d_k$ ($x=d_0+d_k$) and by $-d_k$ ($x=d_0-d_k$), with the prescribed distance $d_0$ being the center.

This is equal to a phenomenon observed in the profile P(x) of FIG. 12, in which local maximums appear both in the regions where x is positive and x is negative, with x=0 being the center. Therefore, the local maximum value appearing in the negative region ($x=d_0-d_k$) substantially has the negative frequency influence on the local maximum value appearing in the positive region ($x=d_0+d_k$) with $x=d_0$ being the center, so that measurement error increases.

Specifically, as the distance $d_k$ comes closer to 0 m, the two local maximum values come closer to the central value $d_0$ and interfere with each other, enlarging the measurement error. When the object $M_k$ is moving fast, a reversal phenomenon occurs, in which the local maximum that should appear in the positive region ($x=d_0+d_k$) appears in the negative region ($x=d_0-d_k$) and the local maximum value that should appear in the negative region appears in the positive region. As a result, it becomes difficult to determine which is the true local value, and measurement error increases.

Therefore, the distance measuring device in accordance with the present invention utilizes only one of the upper side band USB and the lower side band LSB as the analysis signal p(f), as means for suppressing the substantial influence of negative frequency.

Specifically, when the upper side band USB is utilized as the analysis signal p(f), the analysis signal p(f) is represented by Equation (13) above. When the lower side band LSB is utilized as the analysis signal p(f), the analysis signal p(f) is given as $p(f)=I(f) \cdot I_o(f) - Q(f) \cdot Q_0(f)$.

Assume that the upper side band of Equation (13) is used as the analysis signal p(f) and the following formula of Fourier transform is applied:

$$\int_{-\infty}^{+\infty} f(t)e^{-j\omega t}dt \quad \text{Equation (14)}$$

Then, the resulting profile P(x) at the distance x will be $$P(x) \equiv \int_{f_0-\frac{f_w}{2}}^{f_0+\frac{f_w}{2}} p(f)e^{-j\frac{2\pi f}{c}2x}df \quad \text{Equation (15)}$$

$$= \int_{f_0-\frac{f_w}{2}}^{f_0+\frac{f_w}{2}} A^2 \gamma_k \cos\left(\frac{4\pi(d_0+d_k)}{c}f + \phi_k\right)e^{-j\frac{4\pi x}{c}f}df$$

where $f_0$ represents the central frequency of transmission frequency band, and $f_w$ represents the bandwidth of transmission frequency.

According to the above, the profile P(x) of Equation (15) has the local maximum at the position $x=d_0+d_k$, which means that the substantial influence of negative frequency caused by the local maximum positioned at $x=d_0-d_k$ is eliminated.

Here, consider mixing of the real signal $e^{j\theta(f)}$ having the periodicity corresponding to the period $d_k$ and the signals $I_0(f)$ and $Q_0(f)$ having periodicity corresponding to the prescribed distance $d_0$. Of the components in Equation (13) applied hereto, the signals $I_0(f)$ and $Q_0(f)$ can be obtained in accordance with Equations (11) and (12). As for the real signal $e^{j\theta(f)}$, the real component (cos function) can be derived from the received reflected signal R, while imaginary component (sin function) can not be derived.

Generally, Hilbert transform is known as a method of deriving a complex sin function $e^{j\theta(f)}$ from cos function. Specifically, the complex sin function $e^{j\theta(f)}$ can be obtained by finding a sin function that is orthogonal to the cos function. It is necessary, however, that the cos function as the base must have sufficient periodicity, in order to generate the complex sin function through Hilbert transform. Therefore, when the distance d is short and sufficient periodicity can not be found in the cos function, application of Hilbert transform is difficult.

In contrast, according to the present embodiment, as represented by Equation (7) synchronous detection of the reflected wave R with the in-phase signal and the quadrature signal of the transmission signal realizes extraction of the DC component, and therefore, the in-phase component I(f) as the real component and the quadrature component Q(f) as the imaginary component can be obtained, from which the complex sin function $e^{j\theta(f)}$ can be obtained.

Specifically, in the distance measuring device of the present invention, a real signal having periodicity corresponding to the distance $d_k$ is derived by synchronous detection of the reflected wave R, and a signal having periodicity corresponding to the prescribed distance $d_0$ is derived in accordance with the equations, whereby an analysis signal p(f) having the substantial influence of negative frequency eliminated, can be generated.

Here, the method of setting the prescribed distance $d_0$, which is important in generating the analysis signal p(f), will be described.

A profile P(x) obtained by Fourier transform of the analysis signal p(f) defined by Equation (13) has local maximums appearing in the regions where x is positive ($x=d_0+d_k$) and x is negative ($x=d_0-d_k$), respectively, in correspondence with the components of the second and third terms, as in the conventional profile P(x) shown in FIG. 12. Therefore, in setting the prescribed distance $d_0$, it is necessary that at least the minimum detectable distance $d_{min}$ of Equation (4) be ensured when the object $M_k$ is stationary. Additionally considering the window function of Fourier transform, the prescribed distance $d_0$ is set to twice the minimum detectable distance $d_{min}$.

Further, when the object of measurement $M_k$ moves, it must be set based on the relation between the distance $d_k$ to the object of measurement and the speed of movement.

Specifically, at the time of sweeping of transmission frequency f, when the bandwidth $f_w$ is swept with the division number of N, the maximum detectable distance $d_{max}$ derived from a sampling theorem would be $d_{max}=N \cdot C/f_w$. When the object of measurement $M_k$ is moving, the result of measurement (first position information) obtained by Fourier transform of the analysis signal p(f) resulting from upward sweep of transmission frequency f and the result of measurement (second position information) obtained by Fourier transform of the analysis signal p(f) resulting from downward sweep of transmission frequency f are found, and correction by averaging the first position information and the second position information is performed to detect the position of the moving object $M_k$. The first position information and the second position information here represent data shifted farther and closer from the correction value as the center. The amount of shifting becomes larger as the speed of movement increases. Therefore, if the prescribed distance $d_0$ is set such that its maximum value is one-half (½) the maximum detectable distance $d_{max}$, the correction described above is possible.

When the speed of movement of object $M_k$ increases, the number of wavelengths of reflected wave R included in the bandwidth $f_w$ increases, and therefore, it becomes necessary to increase the number of divisions N in sweeping the transmission frequency f. At this time, the prescribed distance $d_0$ increases in proportion to the increase of maximum detectable distance $d_{max}$. Specifically, the prescribed distance $d_0$ is a variable value set in accordance with the distance $d_k$ to the object of measurement $M_k$ and the speed of movement.

As described above, in the distance measuring device in accordance with the present invention, the signal having periodicity corresponding to the distance $d_k$ is extracted from the reflected wave R, and using one of the two side bands that generate when the frequency of the signal is shifted by the periodicity corresponding to the distance $d_0$, the analysis signal p(f) is generated. Means for generating the analysis signal p(f) includes means for frequency conversion and means for synchronous detection of the reflected wave R.

This is different from the conventional distance measuring device in which the reception power signal of the received standing wave is subjected to Fourier transform, in that an apparent standing wave is formed from the reflected wave and the analysis signal p(f) generated by using the standing wave is subjected to Fourier transform. Because of this difference, by the distance measuring device in accordance with the present invention, it becomes possible to eliminate the influence of negative frequency and to correctly measure the distance $d_k$ even when the object $M_k$ is positioned at a short distance or when the object $M_k$ is moving.

Figure 2:
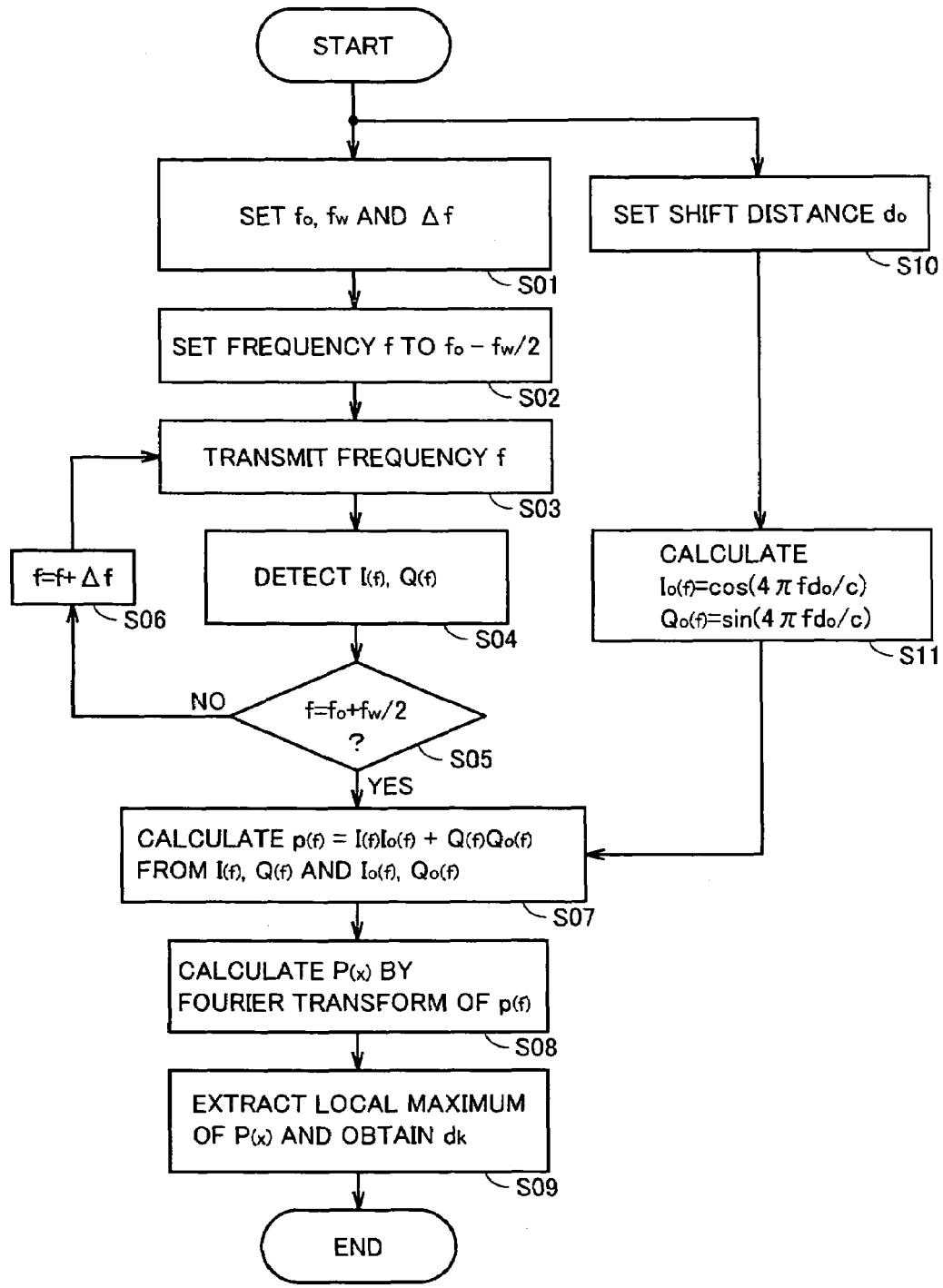
FIG. 2 is a flowchart illustrating a measuring operation by the distance measuring device shown in FIG. 1.

FIG. 2 is a flowchart representing an operation for realizing the principle of measurement described above, of the distance measuring device shown in FIG. 1.

Referring to FIG. 2, first, prior to measurement, frequency conditions are set at a frequency control unit 14 of FIG. 1. Specifically, the central frequency $f_0$ of the electromagnetic wave emitted from transmission unit 20, transmission frequency range $f_w$ and the frequency step $\Delta f$ for sweeping are set (step S01).

When frequency conditions are set, frequency control unit 14 sets, as the transmission frequency f at the start of sweeping, $f=f_0-f_w/2$. Frequency control unit 14 outputs a control signal for controlling the oscillation frequency of VCO at sending unit 12 such that it attains to the transmission frequency f (step S02).

In response to the control signal from control unit 14, sending unit 12 adjusts the oscillation frequency of itself to the transmission frequency f, and outputs a signal of the transmission frequency f (step S03). Transmission unit 20 emits an electromagnetic wave having the same frequency f as the output signal, to the object of measurement $M_k$.

Then, detecting unit 30 detects reflected wave R that is the traveling wave D having the transmission frequency f reflected by the object of measurement. At this time, when the reflected wave R is detected from the received signal of transmission unit 20 through directional coupler 32, the reflected wave R is subjected to synchronous detection with the transmission signal and the DC component is extracted, whereby the in-phase component I(f) and the quadrature component Q(f) of the reflected wave R are detected (step S04).

The detecting operation of steps S03 and S04 is performed again with the transmission frequency f increased by the frequency step $\Delta f$ (step S06). The series of operations described above is repeated until the transmission frequency f eventually reaches the frequency $f_0+f_w/2$, that is, the frequency at the end of sweeping (step S05).

At step S05, when the detection of in-phase component I(f) and the quadrature component Q(f) of the reflected wave R with the prescribed frequency bandwidth $f_w$ ends, the analysis signal p(f) is calculated from the in-phase component I(f) and the quadrature component Q(f), at analysis signal generating unit 42 in signal processing unit 40 (step S07).

Here, at analysis signal generating unit 42, when the prescribed distance $f_0$ is set based on the position and the speed of movement of the object $M_k$ as shown at step S10, signals $I_0(f)$ and $Q_0(f)$ having periodicity corresponding to the distance $d_0$ are calculated using Equations (11) and (12) (step S11). At step S07, the in-phase component I(f) and the quadrature component Q(f) and the signals $I_0(f)$ and $Q_0(f)$ are mixed, and using one of the generated two side bands (for example, upper side band USB), the analysis signal p(f) is generated.

The analysis signal p(f) obtained at step S07 is subjected to Fourier transform in Fourier transform unit 44. Thus, profile P(x) is derived (step S08).

Finally, by extracting the local maximum of profile P(x), the distance $d_k$ to the object of measurement $M_k$ can be obtained (step S09).

Figure 3:
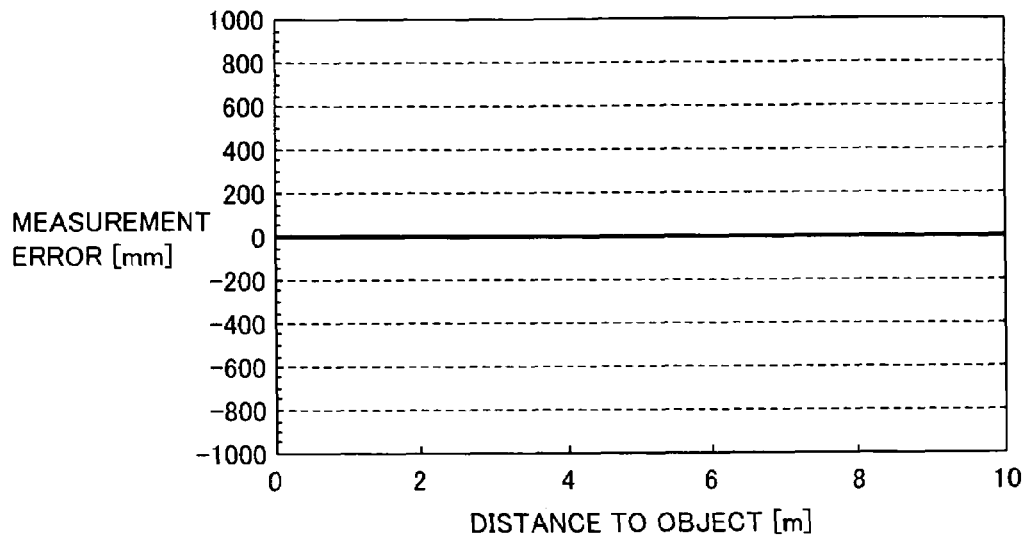
FIGS. 3 and 4 show relations between a distance $d_k$ (measured value) to the object of measurement $M_k$ obtained from profile P(x) and the actual distance to the object of measurement $M_k$.

FIG. 3 shows a relation between a distance $d_k$ (measured value) to the object of measurement $M_k$ obtained from profile P(x) and the actual distance to the object of measurement. The relation shown in this figure is obtained under the conditions of: $f_0$=24.0375 GHz, $f_w$=75 MHz, $\gamma_k$=0.1 and $\phi_k$=$\pi$, with the distance $d_k$ to the object of measurement $M_k$ varied in the range of 0 m$\leq d_k \leq$10 m.

As shown in FIG. 3, the distance $d_k$ to the object of measurement obtained from profile P(x) and the actual distance to the object of measurement satisfies the relation of one-to-one correspondence over the entire range of 0 m$\leq d_k \leq$10 m. Consequently, it becomes possible to measure the distance in the range of 2 m or shorter, which could not be measured conventionally as seen in FIG. 12. Particularly, measurement of distance from d=0 m becomes possible.

Figure 4:
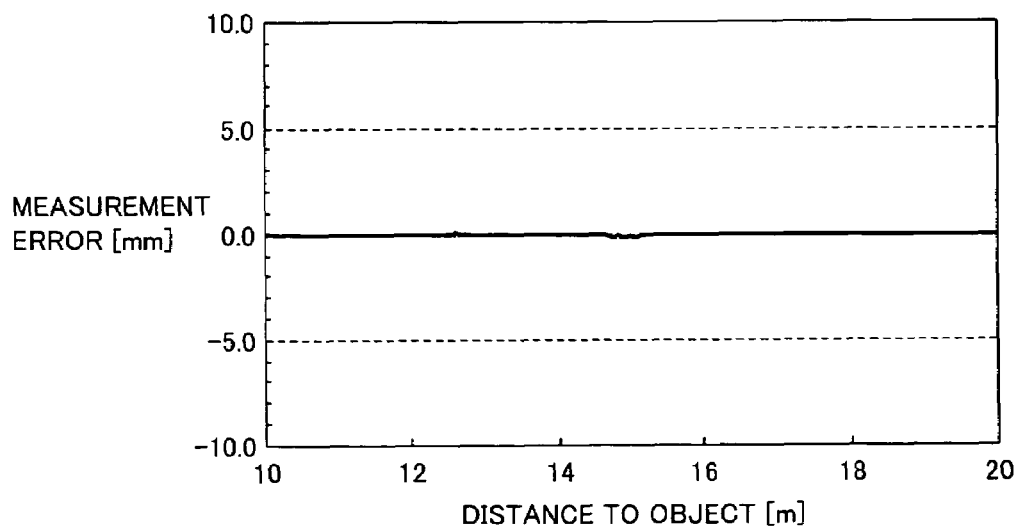

FIG. 4 shows a relation between the measured distance and the actual distance to the object of measurement, when the distance $d_k$ to the object of measurement $M_k$ is in a far distance level (10 m$\leq d_k \leq$20 m).

Figure 13:
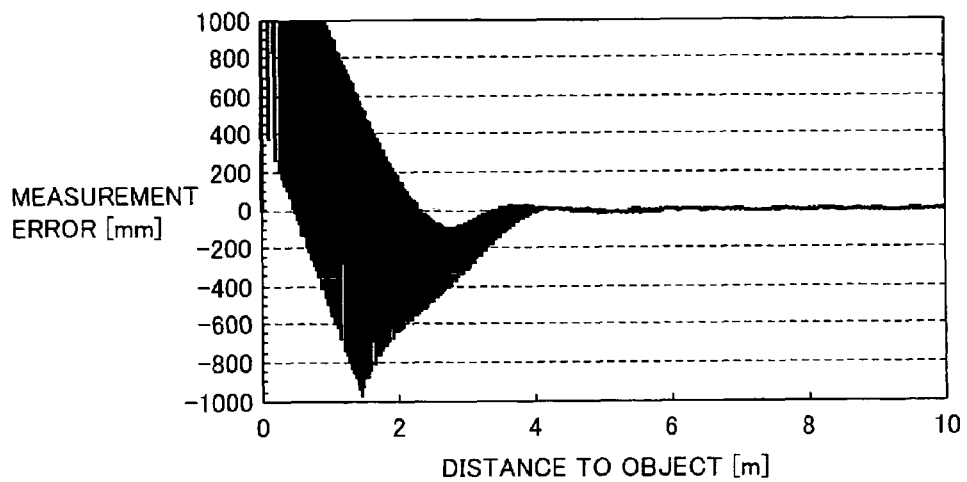
FIGS. 13 and 14 show relations between the distance $d_k$ (measured value) to the object of measurement $M_k$ obtained from the profile P(x) and the actual distance to the object of measurement.
Figure 14:
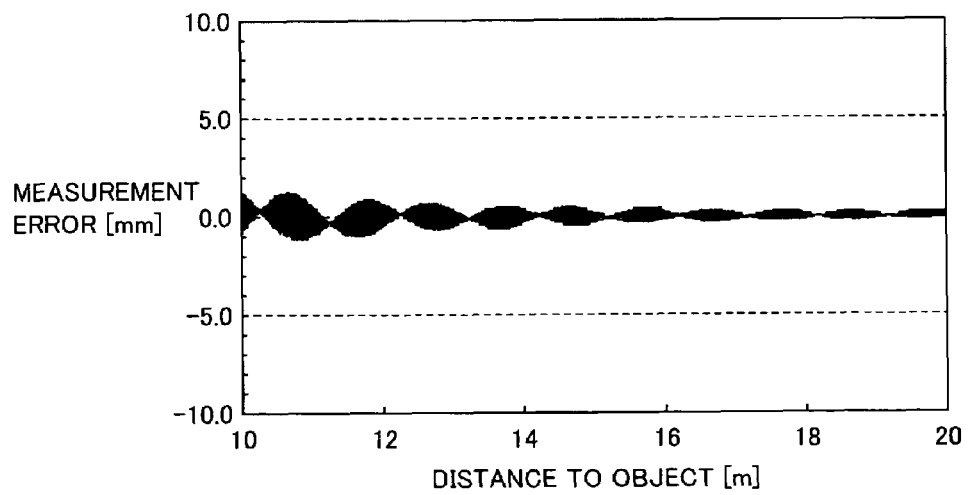
Figure 15:
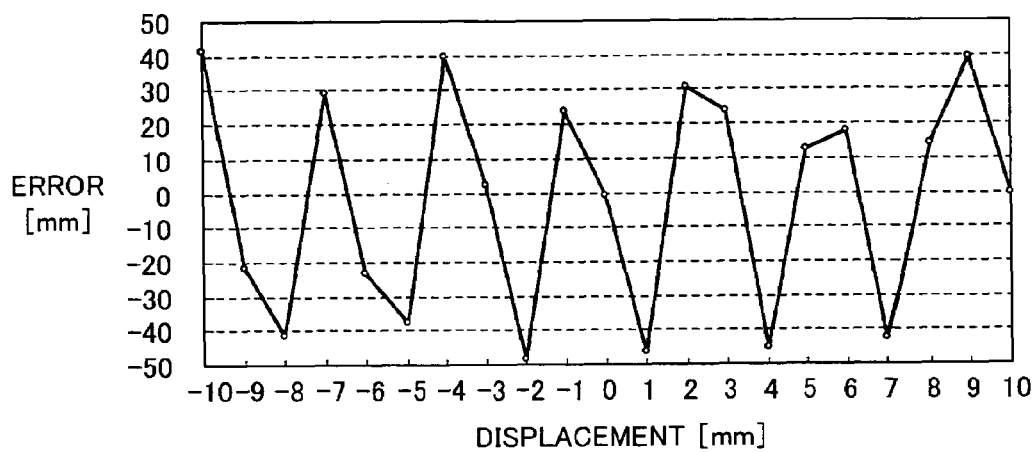
FIG. 15 shows measurement error when the position of the object of measurement $M_k$ is changed slightly within the range of $\pm 10$ mm, using the position at a distance $d_k=10$ m as a reference.
Figure 16:
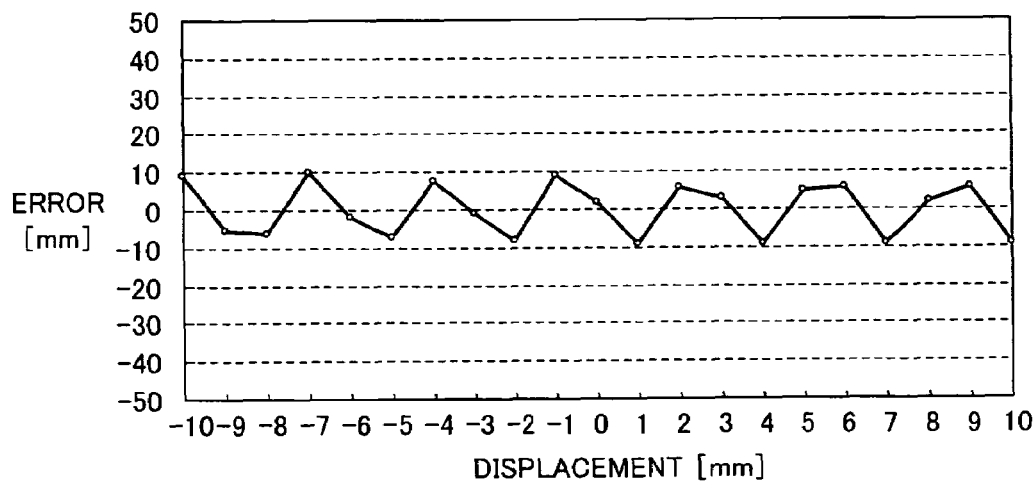
FIG. 16 shows the result of measurement when the reception power signal is multi-processed.
Figure 17:
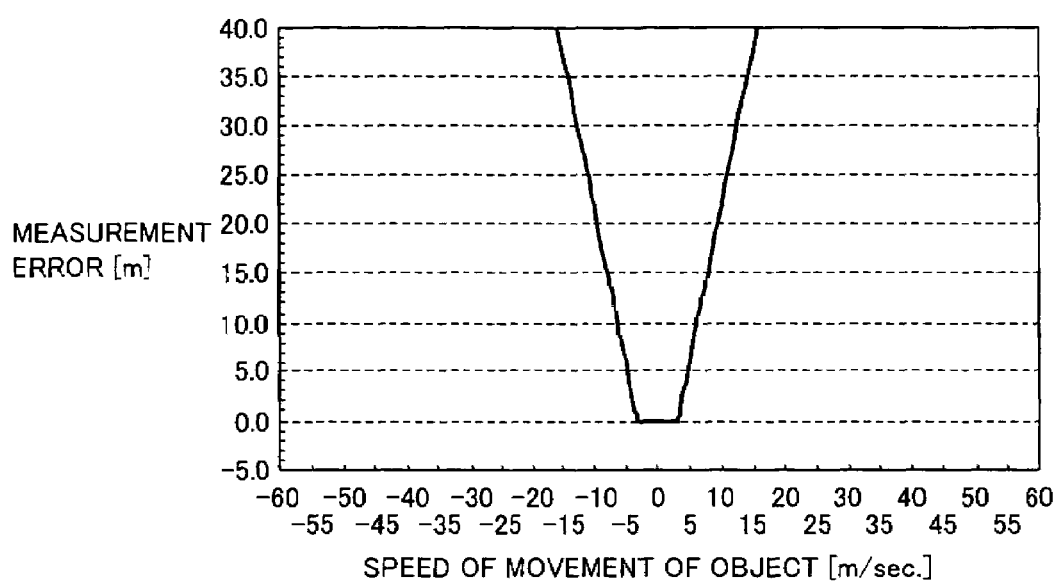
FIG. 17 shows a relation between a distance (measured value) obtained from profile P(x) and speed of movement of the object of measurement $M_k$ when the object is moving at a constant speed.

As is apparent from FIG. 4, the error shown in FIG. 13 is not generated on the distance $d_k$ to the object of measurement $M_k$. Therefore, it is also possible to reduce measurement error for the object $M_k$ positioned at a middle distance or farther.

The operation of measuring the distance $d_k$ to the moving object $M_k$ by the distance measuring device shown in FIG. 1 will be described in the following.

Figure 5:
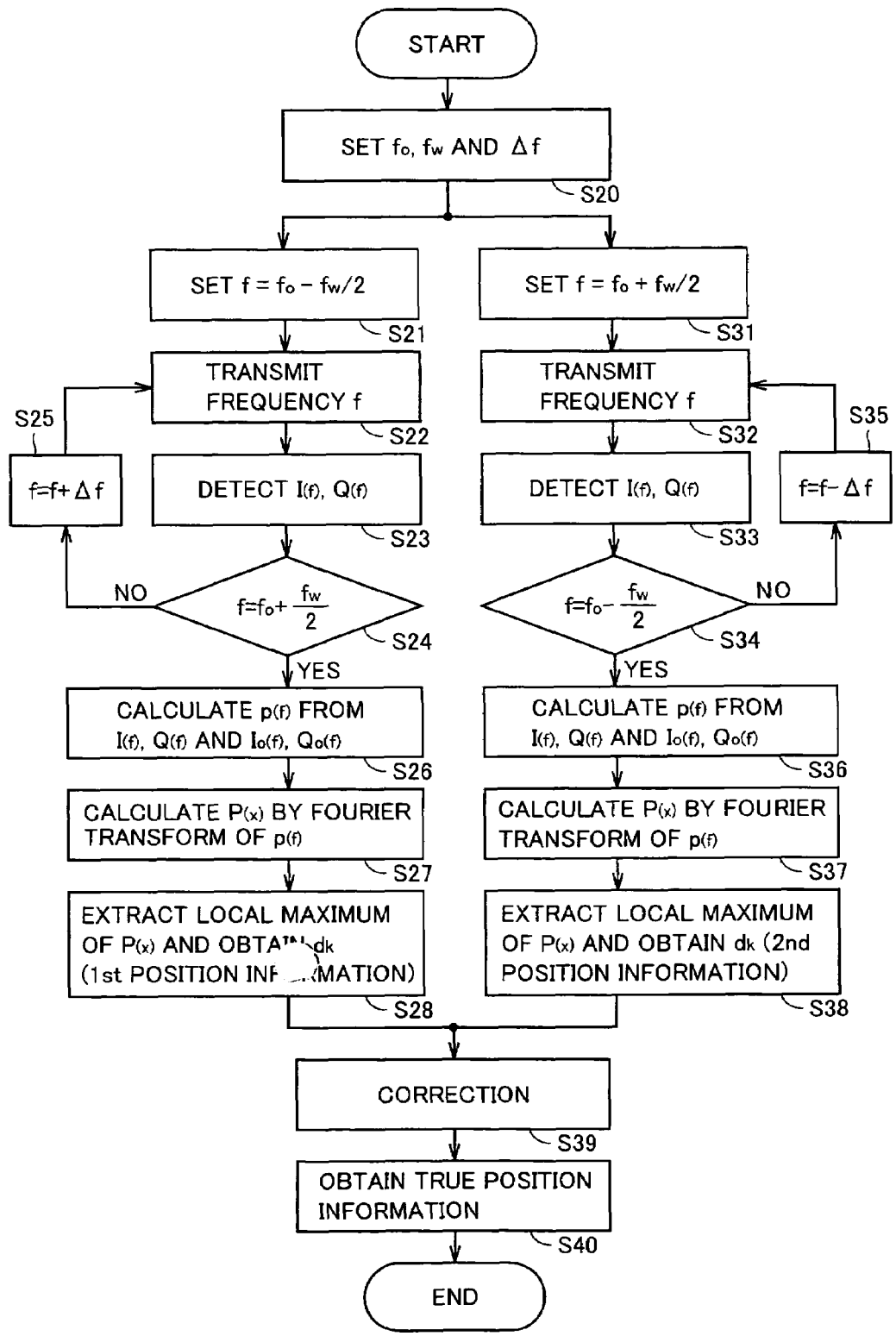
FIG. 5 is a flowchart illustrating a measuring operation by the distance measuring device shown in FIG. 1.

FIG. 5 is a flowchart illustrating a measuring operation by the distance measuring device shown in FIG. 1.

Referring to FIG. 5, first, prior to measurement, frequency conditions are set at a frequency control unit 14 of FIG. 1. Specifically, the central frequency $f_0$ of the electromagnetic wave emitted from transmission unit 20, transmission frequency range $f_w$ and the frequency step $\Delta f$ for sweeping are set (step S20). In the following, the first position information and the second position information are detected by increasing the transmission frequency f by the frequency step $\Delta f$ (corresponding to upward sweep) or decreasing the transmission frequency f by the frequency step $\Delta f$ (corresponding to downward sweep).

First, for the upward sweep, when frequency conditions are set, frequency control unit 14 sets, as the transmission frequency f at the start of sweeping, f=$f_0$−$f_w$/2. Frequency control unit 14 outputs a control signal for controlling the oscillation frequency of VCO at sending unit 12 such that it attains to the transmission frequency f (step S21).

In response to the control signal from control unit 14, sending unit 12 adjusts the oscillation frequency of itself to the transmission frequency f, and outputs a signal of the transmission frequency f (step S22). Transmission unit 20 emits an electromagnetic wave having the same frequency f as the output signal, to the object of measurement $M_k$.

Then, detecting unit 30 detects reflected wave R that is the traveling wave D having the transmission frequency f reflected by the object of measurement. Detecting unit 30 performs synchronous detection on the reflected wave R with the in-phase signal and the quadrature signal of the transmission signal, whereby the in-phase component I(f) and the quadrature component Q(f) of the reflected wave R are detected (step S23).

The detecting operation of steps S22 and S23 is performed again with the transmission frequency f increased by the frequency step $\Delta f$ (step S24). The series of operations described above is repeated until the transmission frequency f eventually reaches the frequency $f_0$+$f_w$/2, that is, the frequency at the end of sweeping (step S25).

At step S25, when the detection of in-phase component I(f) and the quadrature component Q(f) of the reflected wave R with the prescribed frequency range $f_w$ ends, the in-phase component I(f) and the quadrature component Q(f) and the signals $I_0(f)$ and $Q_0(f)$ having periodicity corresponding to the prescribed distance $d_0$ are mixed at analysis signal generating unit 42 in signal processing unit 40, and from the upper side band USB generated at this time, the analysis signal p(f) is calculated (step S26).

Further, the obtained analysis signal p(f) is subjected to Fourier transform in Fourier transform unit 44. Thus, profile P(x) is derived (step S27).

Finally, the local maximum of profile P(x) is extracted, and the prescribed distance $d_0$ is subtracted from the position x that provides the local maximum, whereby the distance $d_k$ to the object of measurement $M_k$ is obtained (step S28). The detected distance $d_k$ is stored as the first position information, in Fourier transform unit 44.

Next, for the downward sweep, when frequency conditions are set, frequency control unit 14 sets, as the transmission frequency f at the start of sweeping, f=$f_0$+$f_w$/2. Frequency control unit 14 outputs a control signal for controlling the oscillation frequency of VCO at sending unit 12 such that it attains to the transmission frequency f (step S31).

In response to the control signal from control unit 14, sending unit 12 adjusts the oscillation frequency of itself to the transmission frequency f, and outputs a signal of the transmission frequency f. Transmission unit 20 emits an electromagnetic wave having the same frequency f as the output signal, to the object of measurement $M_k$ (step S32).

Then, detecting unit 30 detects reflected wave R that is the traveling wave D having the transmission frequency f reflected by the object of measurement. Through the process step similar to step S23, the in-phase component I(f) and the quadrature component Q(f) of the reflected wave R are detected (step S33).

The detecting operation of steps S32 and S33 is performed again with the transmission frequency f decreased by the frequency step $\Delta f$ (step S34). The series of operations described above is repeated until the transmission frequency f eventually reaches the frequency $f_0$−$f_w$/2, that is, the frequency at the end of sweeping (step S35).

At step S34, when the detection of in-phase component I(f) and the quadrature component Q(f) of the reflected wave R with the prescribed frequency range $f_w$ ends, the in-phase component I(f) and the quadrature component Q(f) and the signals $I_0(f)$ and $Q_0(f)$ having periodicity corresponding to the prescribed distance $d_0$ are mixed at analysis signal generating unit 42 in signal processing unit 40, and from the upper side band at this time, the analysis signal p(x) is calculated (step S36).

The obtained analysis signal p(f) is subjected to Fourier transform in Fourier transform unit 44. Thus, profile P(x) is derived (step S37).

Finally, the local maximum of profile P(x) is extracted, and the distance $d_k$ to the object of measurement $M_k$ is obtained (step S38). The detected distance $d_k$ is stored as the second position information, in Fourier transform unit 44.

When the first position information and the second position information are transmitted in steps S28 and S38, Fourier transform unit 44 averages these two pieces of position information (step S39). The result is taken as the true position information of the object of measurement $M_k$ (step S40).

Figure 6:
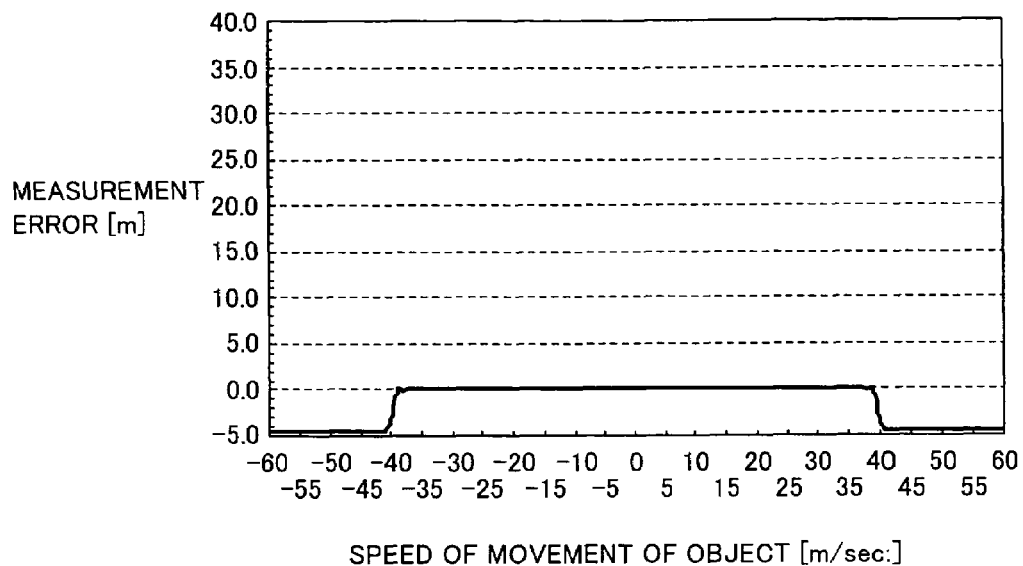
FIGS. 6 and 7 show relations between a distance (measured value) obtained from profile P(x) and speed of movement of the object of measurement.

FIG. 6 shows a relation between a distance (measured value) obtained from the correction process of FIG. 5 and the speed of movement of the object of measurement $M_k$.

Referring to FIG. 6, by the averaging of the first position information as the result of measurement through upward sweep and the second position information as the result of measurement through downward sweep, the measurement error is kept almost 0 m, over the wide range of the speed of movement of object of measurement $M_k$.

Figure 7:
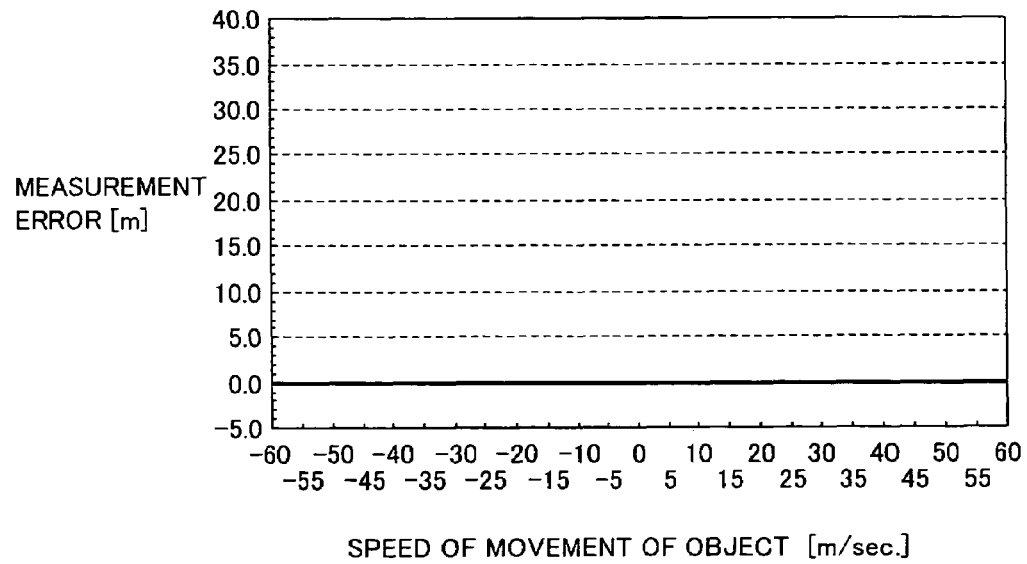

When the speed of movement exceeds 40 m/sec, however, the measurement error of about 5.0 m occurs, as shown in FIG. 6. The measurement error comes from the influence of aliasing for sampling with the number of divisions N of transmission frequency f. By increasing the number of divisions N of transmission frequency f, measurement error at high speed can be avoided, as shown in FIG. 7.

As described above, in the distance measuring device in accordance with the present invention, by synchronous detection of the reflected wave, the in-phase component and the quadrature component are detected, and by using one of the side bands obtained by shifting these components by a frequency corresponding to a prescribed distance as the analysis signal, measurement of short to long distance with high accuracy becomes possible. Even when the object of measurement is moving at a high speed, by performing correction process on the result of measurement obtained by upward sweep and downward sweep of transmission frequency, highly accurate distance measurement becomes possible, independent of the time of sweeping.

Figure 8:
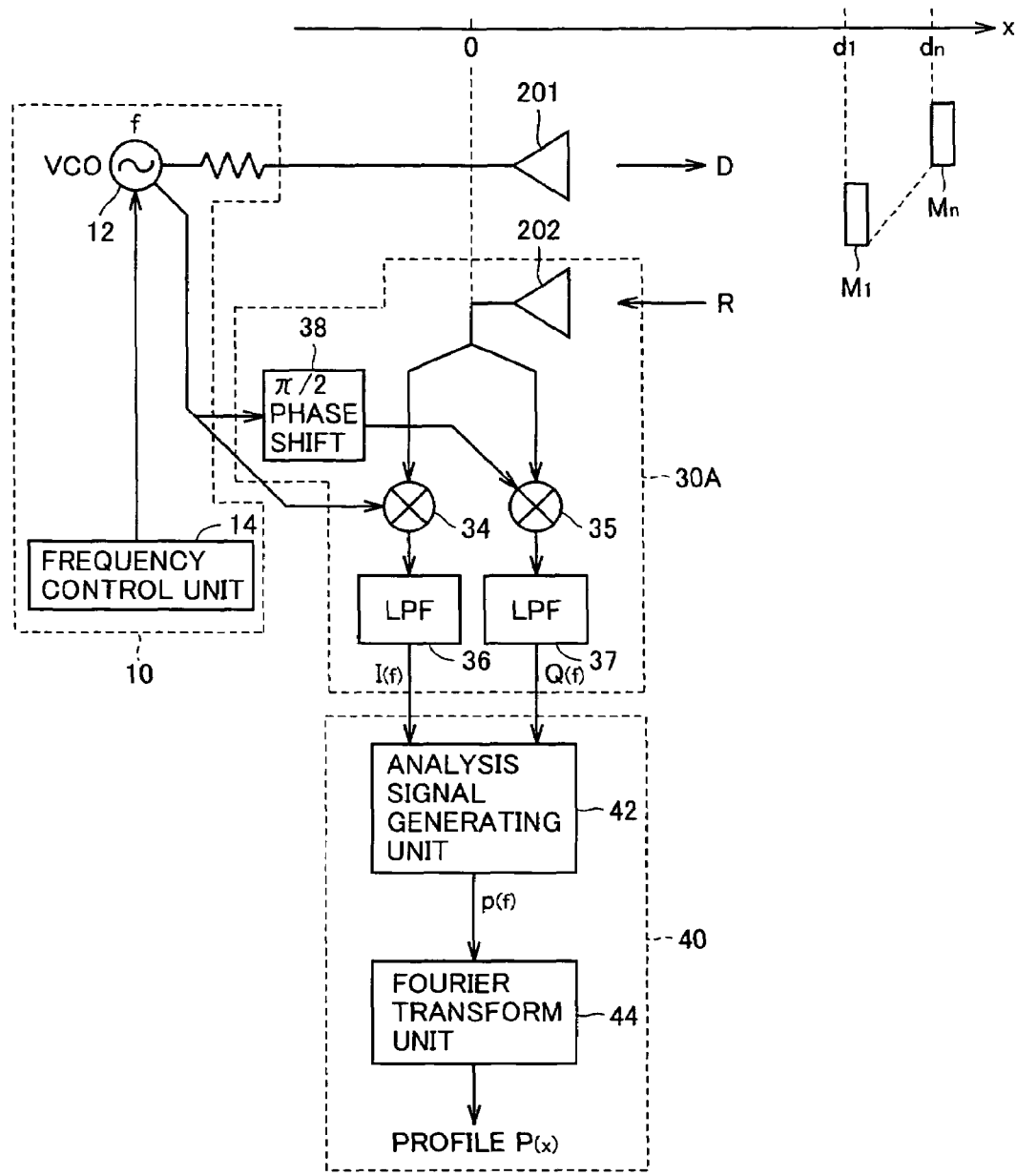
FIGS. 8 and 9 are circuit diagrams showing basic configurations of the distance measuring device in accordance with modifications of the embodiment of the present invention.

In the present embodiment, the reflected wave R is detected by directional coupler 32. Alternatively, it may be detected by an antenna 202 provided for reception only, as shown in FIG. 8. In this case, the signal received by antenna 202 is directly input to one input of multipliers 24 and 26.

Figure 9:
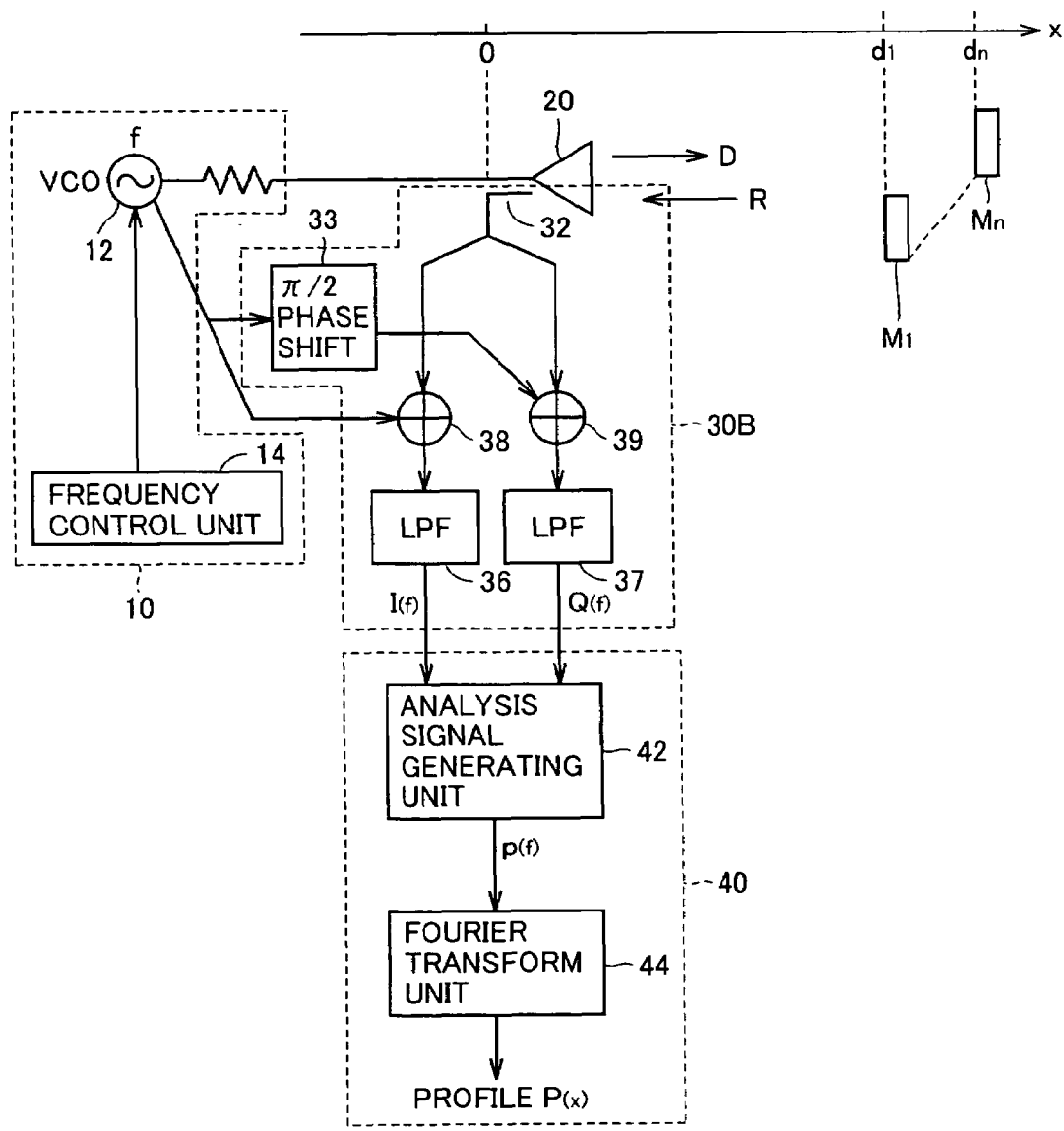

Further, in the present invention, for detecting in-phase component I(f) and quadrature component Q(f) of the reflected wave R, synchronous detection of reflected wave R by analogue multipliers 34, 35 is utilized. If the transmission frequency f of the transmission signal is high and analogue multipliers are not available, multipliers 34 and 35 at detecting unit 30 of FIG. 1 may be replaced by adders 38 and 39 formed of diodes, and envelope detection of reflected wave R may be used for detection, as shown in FIG. 9. In this case, the detection signal also includes the DC component of the transmission signal and, therefore, means for removing the DC component must be provided separately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A distance measuring device measuring a distance to an object of measurement, comprising:
    a sending source outputting a transmission signal having a variable frequency;
    a transmission unit generating and emitting to said object of measurement an electromagnetic wave of the same frequency as said transmission signal;
    a detecting unit detecting a reflected wave of said electromagnetic wave; and
    a signal processing unit calculating a distance to said object of measurement by an operation of a relation between said detected reflected wave and the frequency of said transmission signal; wherein
    said detecting unit includes
    wave-detecting means for performing synchronous detection of said detected reflected wave with said transmission signal, to extract a phase change component of said reflected wave; and
    said signal processing unit includes
    frequency converting means for changing variable frequency of said extracted phase change component by a frequency corresponding to a prescribed distance,
    analysis signal generating means for taking, as an analysis signal, one of upper and lower side bands obtained by said frequency converting means, and
    Fourier transform means for performing Fourier transform on said analysis signal to calculate a profile, and for finding distance to said object of measurement based on a local maximum of said profile and said prescribed distance.

2. The distance measuring device according to claim 1, wherein
    said sending source includes
    upward sweeping means for sweeping upward a prescribed transmission frequency with a prescribed bandwidth at a prescribed step, and
    downward sweeping means for sweeping downward said prescribed transmission frequency with the prescribed bandwidth at the prescribed step;
    said signal processing unit includes
    means for holding, as first position information, a distance to said object of measurement obtained by said Fourier transform means through said upward sweeping means, and as second position information, a distance to said object of measurement obtained by said Fourier transform means through said downward sweeping means, and
    correcting means for averaging said held first position information and second position information to derive true distance to said object of measurement.

3. The distance measuring device according to claim 1, wherein
    said wave-detecting means extracts in-phase component of said phase change component by synchronous detection of said reflected wave with said transmission signal, and extracts quadrature component of said phase change component by synchronous detection of said reflected wave with a signal different in phase by $\pi/2$ from said transmission signal.

4. The distance measuring device according to claim 3, wherein
    said prescribed distance is variable in accordance with a number of divisions to be used to divide a prescribed bandwidth for sweeping a prescribed transmission frequency.

5. The distance measuring device according to claim 4, wherein
    said prescribed distance is set, at the largest, to be approximately a half of a maximum detectable distance determined by said prescribed bandwidth and said number of divisions.

6. The distance measuring device according to claim 1, wherein said wave-detecting means extracts the phase change component of said reflected wave by subtracting DC component of said transmission signal from said reflected wave subjected to envelope detection.

7. A distance measuring method of measuring a distance to an object of measurement, comprising the steps of:
outputting a signal having a variable frequency;
generating and emitting to said object of measurement an electromagnetic wave of the same frequency as said signal;
detecting a reflected wave of said electromagnetic wave; and
calculating a distance to said object of measurement by an operation of a relation between said detected reflected wave and the frequency of said signal; wherein
said step of detecting a reflected wave includes the step of extracting a phase change component of said reflected wave by synchronous detection of said detected reflected wave with said signal; and
said step of calculating the distance to said object of measurement includes the steps of
changing variable frequency of said extracted phase change component by a frequency corresponding to a prescribed distance,
taking, as an analysis signal, one of upper and lower side bands obtained by said frequency change, and
performing Fourier transform on said analysis signal to calculate a profile, and finding distance to said object of measurement based on a local maximum of said profile and said prescribed distance.

8. The distance measuring method according to claim 7, wherein
said step of outputting a signal having variable frequency includes the steps of
sweeping upward a prescribed transmission frequency with a prescribed bandwidth at a prescribed step, and
sweeping downward said prescribed transmission frequency with the prescribed bandwidth at the prescribed step;
said step of calculating the distance to said object of measurement further includes the steps of
holding, as first position information, a distance to said object of measurement obtained by said Fourier transform through said upward sweeping, and as second position information, a distance to said object of measurement obtained by said Fourier transform through said downward sweeping, and
averaging said held first position information and second position information to derive true distance to said object of measurement.

9. The distance measuring method according to claim 7, wherein
in said step of extracting phase change component of said reflected wave,
in-phase component of said phase change component is extracted by synchronous detection of said reflected wave with said signal, and quadrature component of said phase change component is extracted by synchronous detection of said reflected wave with a signal different in phase by $\pi/2$ from said signal.

10. The distance measuring method according to claim 9, wherein
said prescribed distance is variable in accordance with a number of divisions to be used to divide a prescribed bandwidth for sweeping a prescribed transmission frequency.

11. The distance measuring method according to claim 10, wherein
said prescribed distance is set, at the largest, to be approximately a half of a maximum detectable distance determined by said prescribed bandwidth and said number of divisions.

12. The distance measuring method according to claim 7, wherein
in said step of extracting the phase change component of said reflected wave, the phase change component of said reflected wave is extracted by subtracting DC component of said signal from said reflected wave subjected to envelope detection.

13. A signal processing device for a distance measuring device measuring a distance to an object of measurement,
said distance measuring device including a sending source outputting a transmission signal having a variable frequency, a transmission unit generating and emitting to said object of measurement an electromagnetic wave of the same frequency as said transmission signal, and a detecting unit detecting a reflected wave of said electromagnetic wave; and
said detecting unit performing synchronous detection of said detected reflected wave with said transmission signal, to extract a phase change component of said reflected wave,
said signal processing device configured for
changing variable frequency of said extracted phase change component by a frequency corresponding to a prescribed distance,
taking, as an analysis signal, one of upper and lower side bands obtained by changing said frequency, and
performing Fourier transform on said analysis signal to calculate a profile, and finding distance to said object of measurement based on a local maximum of said profile and said prescribed distance.

14. The signal processing device according to claim 13, wherein said sending source sweeps upward a prescribed transmission frequency with a prescribed bandwidth at a prescribed step, and sweeps downward said prescribed transmission frequency with the prescribed bandwidth at the prescribed step; and
said signal processing device is further configured for
holding, as first position information, a distance to said object of measurement obtained by performing Fourier transform on said analysis signal when sweeping upward, and as second position information, a distance to said object of measurement obtained by performing Fourier transform on said analysis signal when sweeping downward, and
averaging said held first position information and second position information to derive true distance to said object of measurement.

15. The signal processing device according to claim 13, wherein said detecting unit extracts in-phase component of said phase change component by synchronous detection of said reflected wave with said transmission signal, and extracts quadrature component of said phase change component by synchronous detection of said reflected wave with a signal different in phase by $\pi/2$ from said transmission signal.

16. The signal processing device according to claim 15, wherein said prescribed distance is variable in accordance with a number of divisions to be used to divide a prescribed bandwidth for sweeping a prescribed transmission frequency.

17. The signal processing device according to claim 16, wherein said prescribed distance is set, at the largest, to be approximately a half of a maximum detectable distance determined by said prescribed bandwidth and said number of divisions.

18. The signal processing device according to claim 13, wherein said detecting unit extracts the phase change component of said reflected wave by subtracting DC component of said transmission signal from said reflected wave subjected to envelope detection.

* * * * *